Nov. 7, 1950 R. C. DEHMEL 2,529,468
RADIO RANGE NAVIGATION APPARATUS FOR
TRAINING AIRCRAFT PERSONNEL
Filed July 27, 1945 15 Sheets-Sheet 10
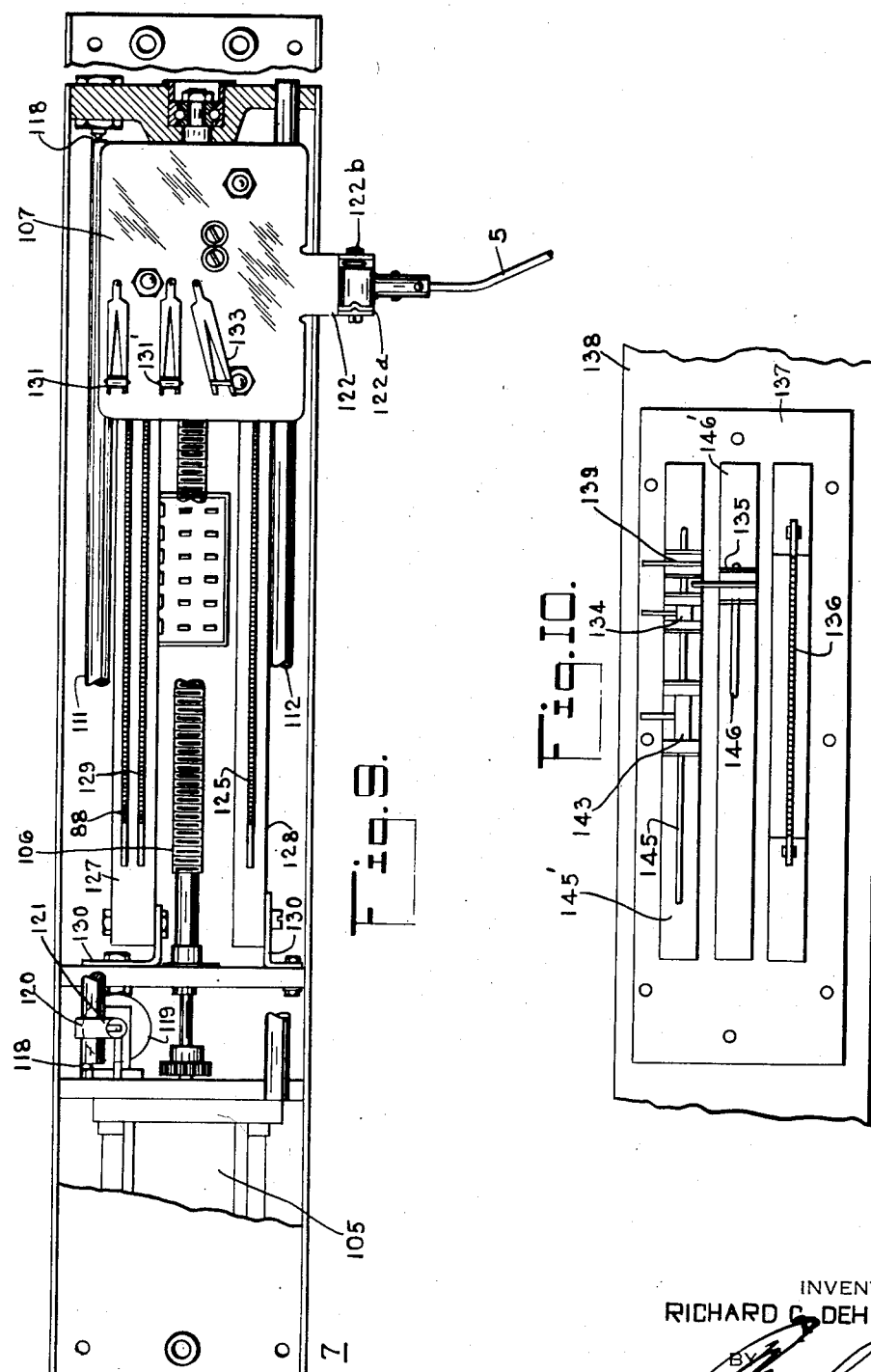
INVENTOR
RICHARD C. DEHMEL
BY
ATTORNEY Nov. 7, 1950
R. C. DEHMEL
2,529,468
RADIO RANGE NAVIGATION APPARATUS FOR
TRAINING AIRCRAFT PERSONNEL
Filed July 27, 1945
15 Sheets-Sheet 11
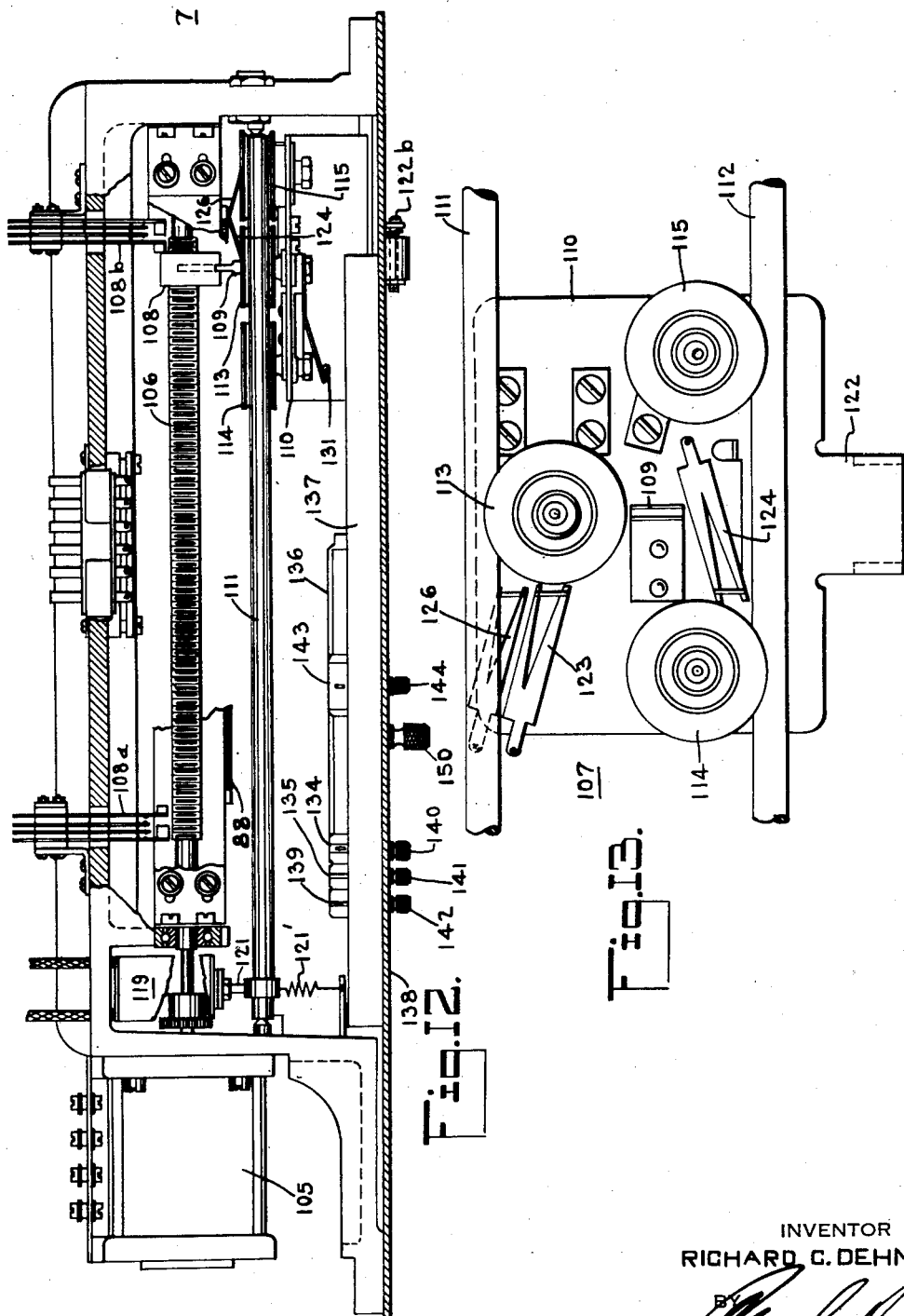
INVENTOR
RICHARD C. DEHMEL
ATTORNEY

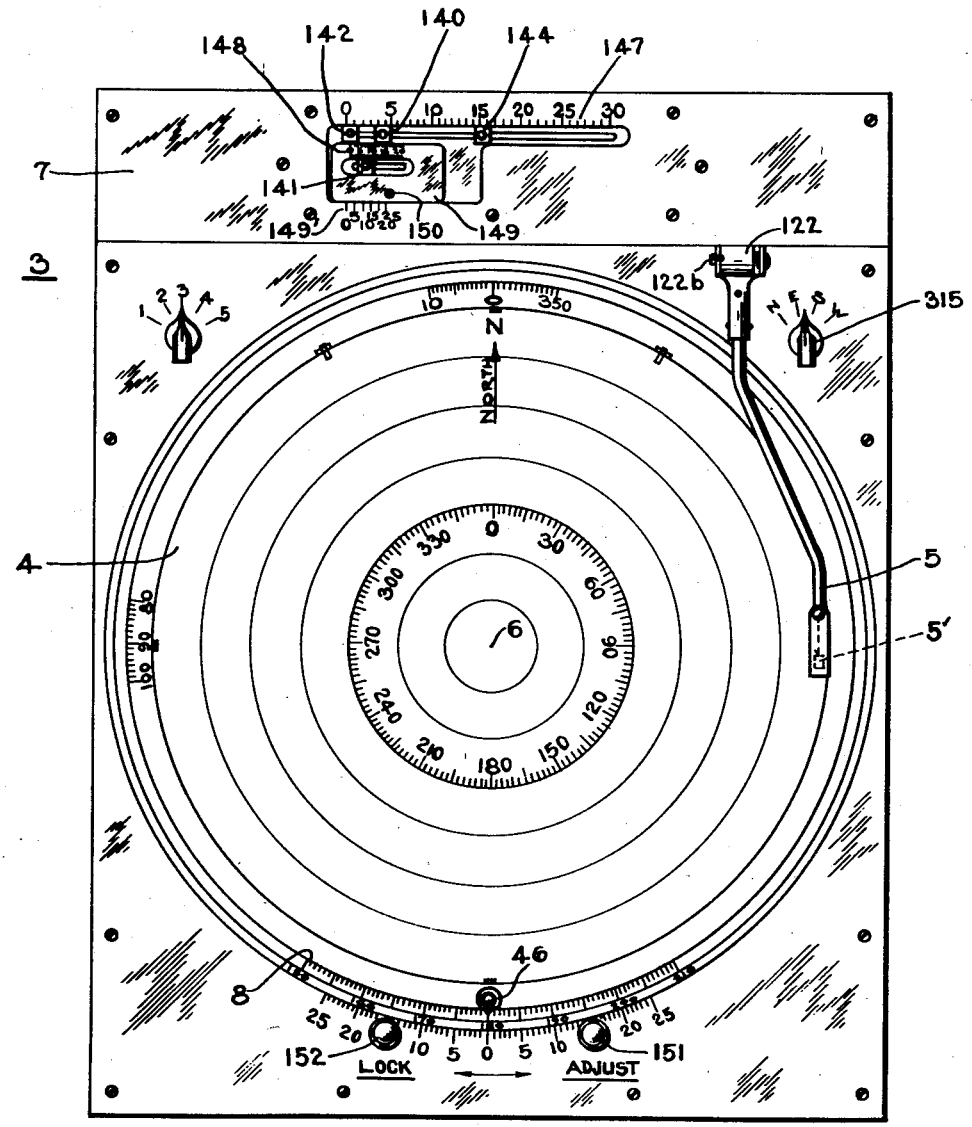
Fig. I.A.

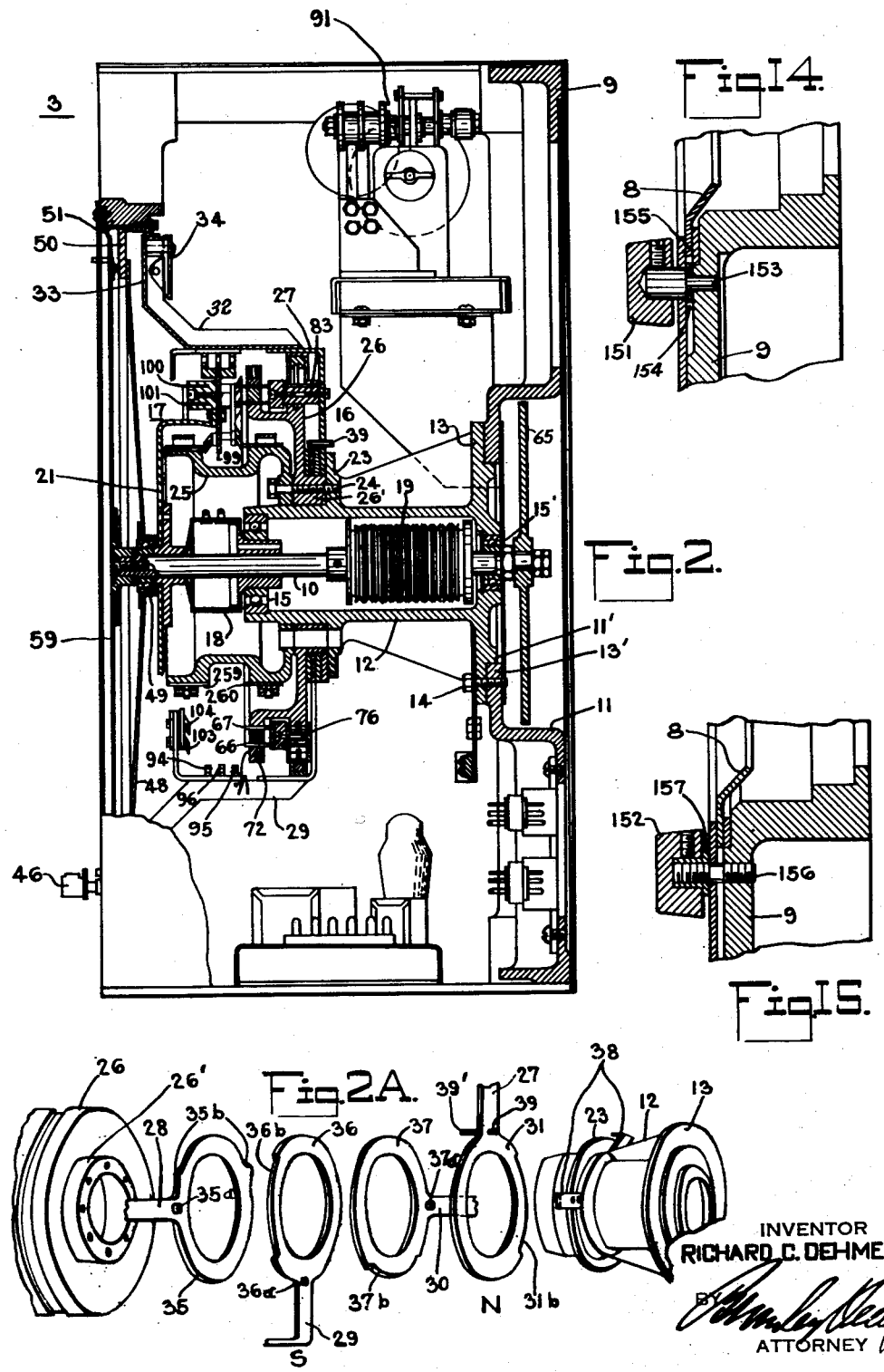

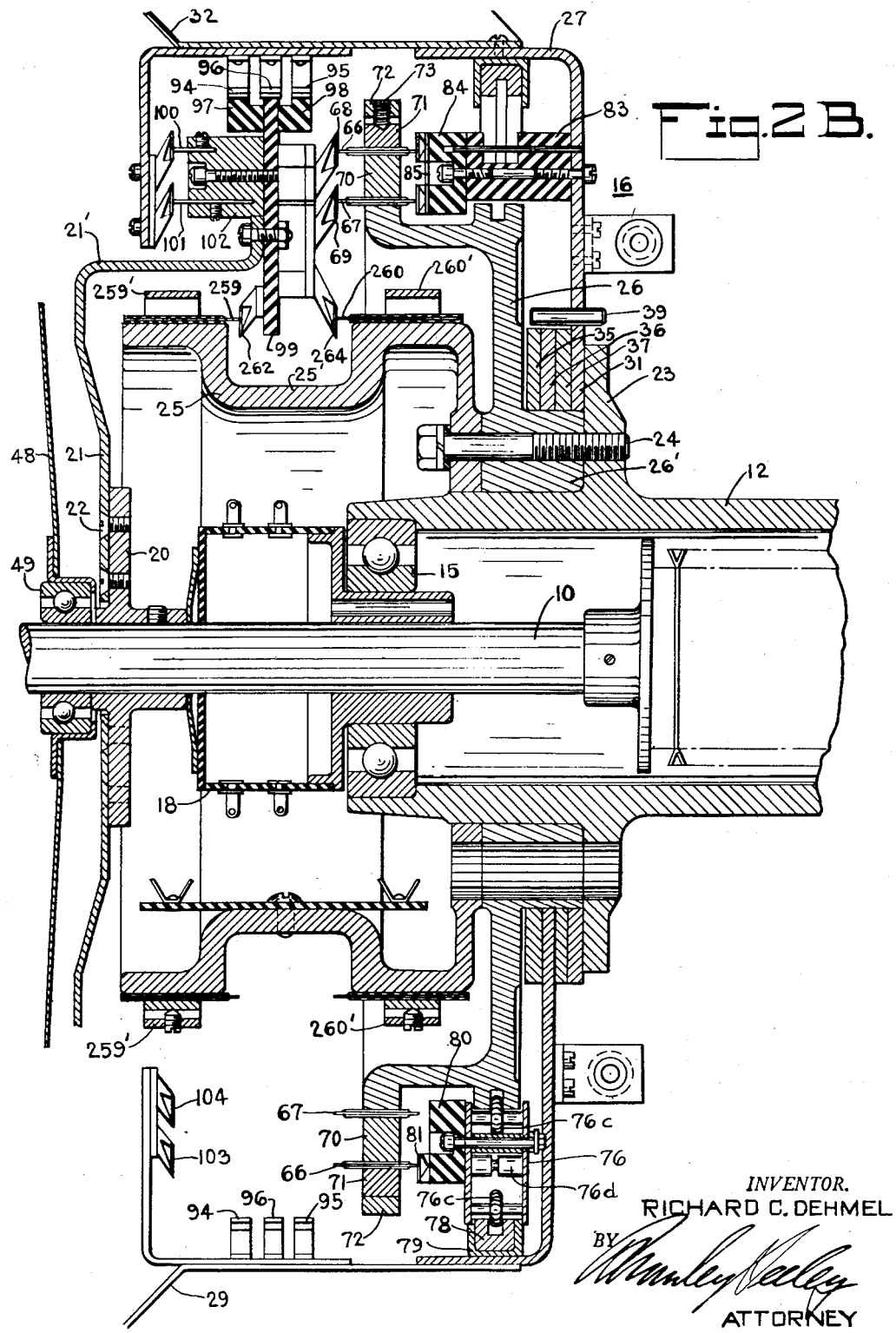

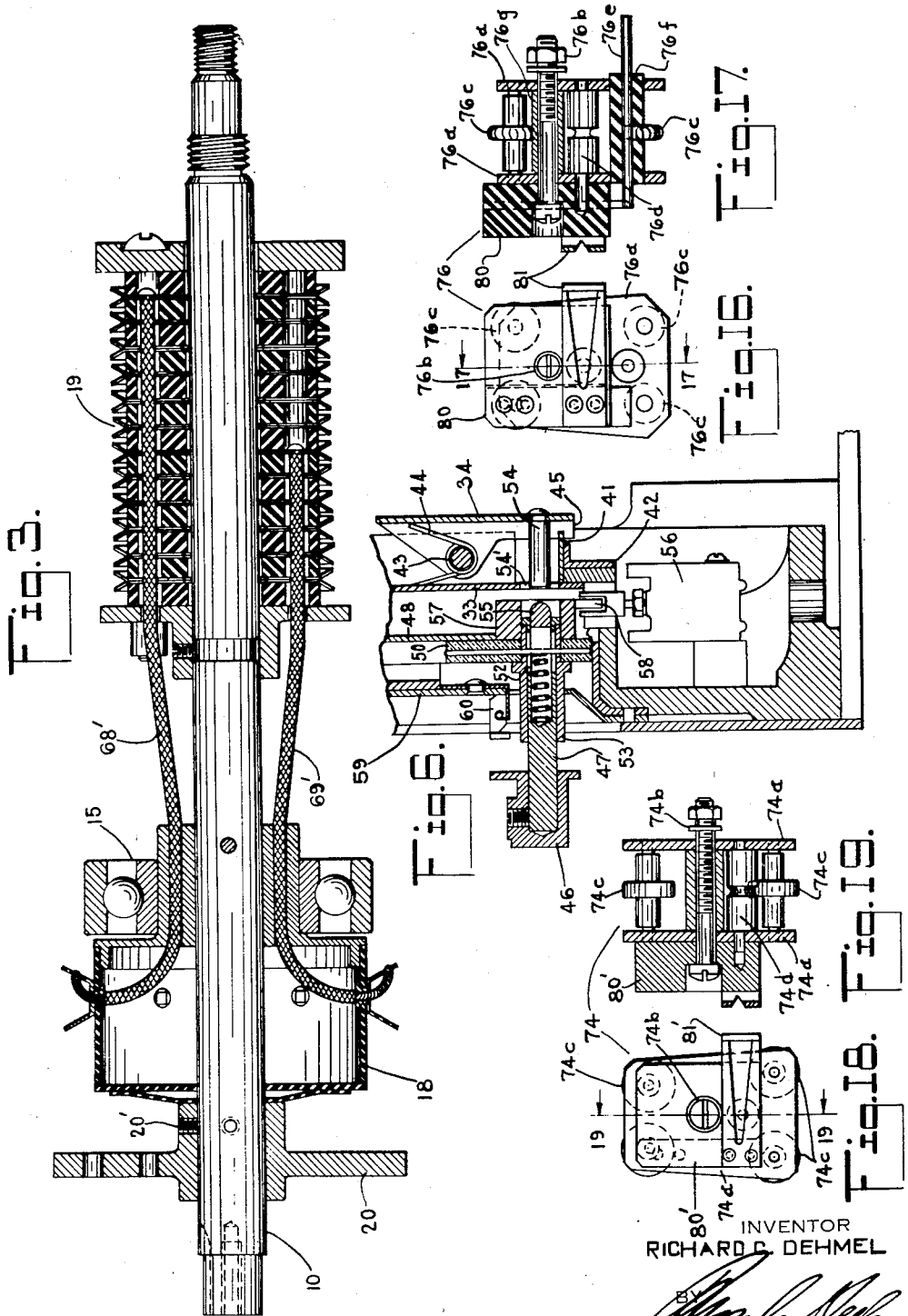

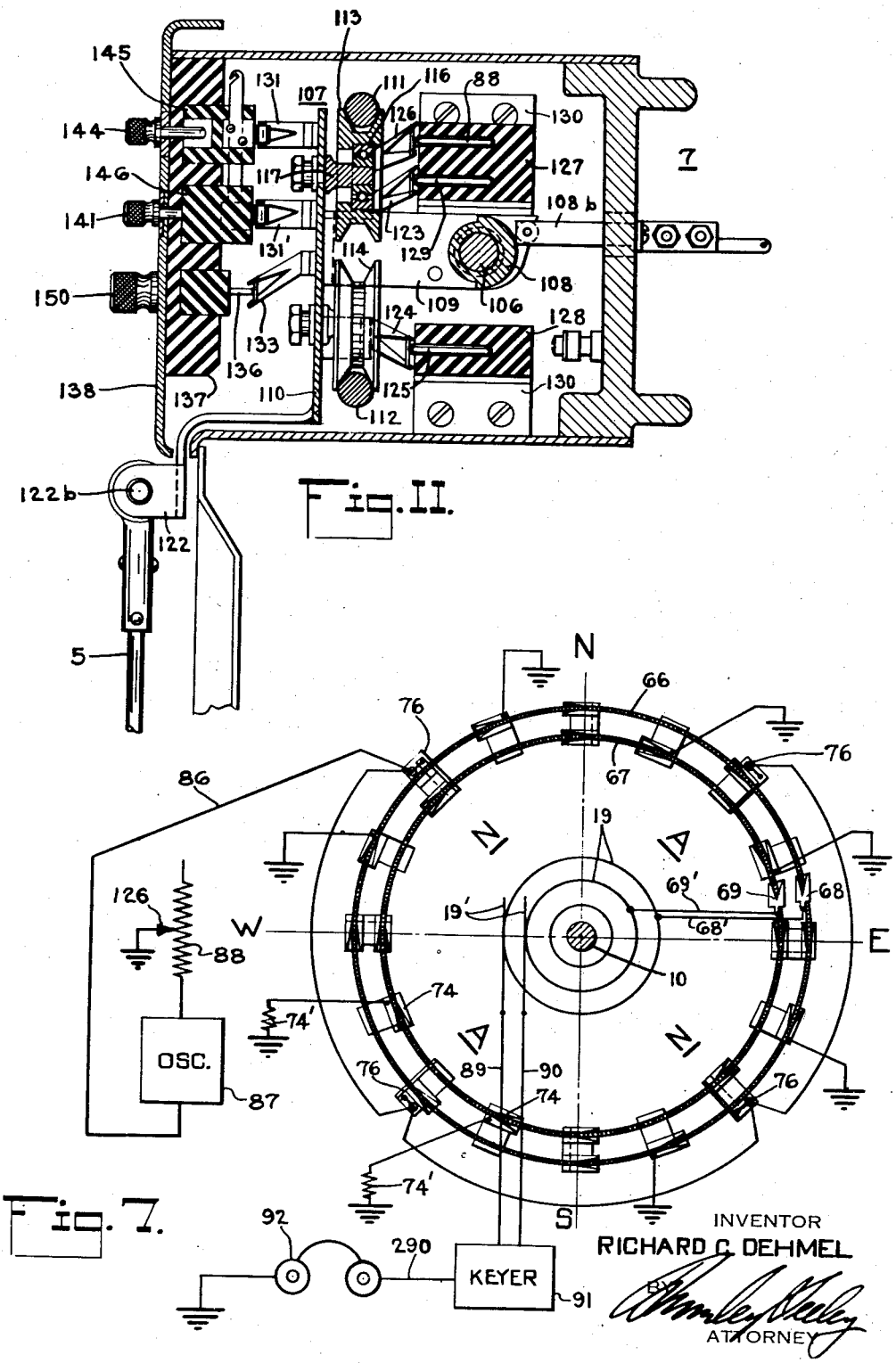

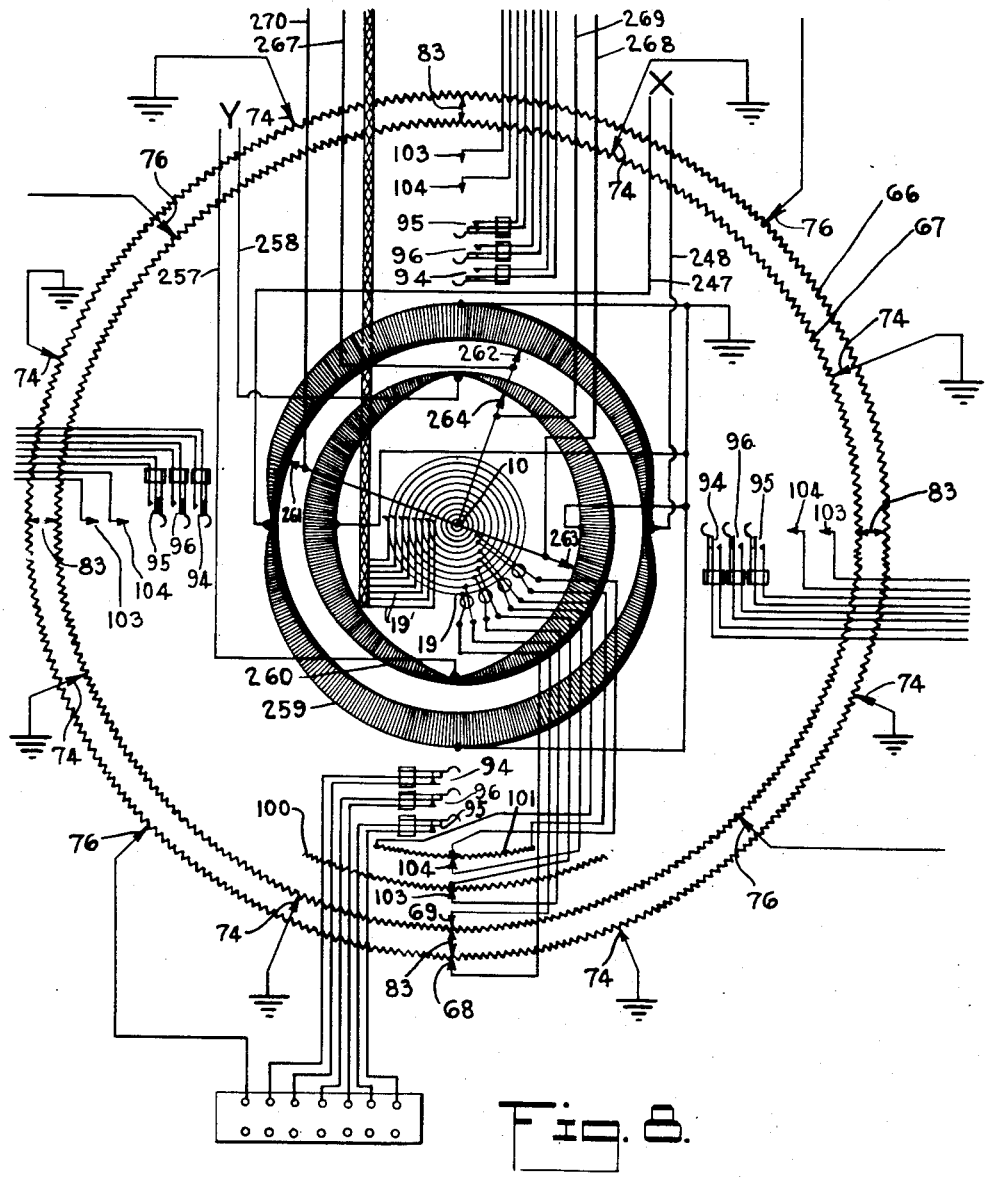

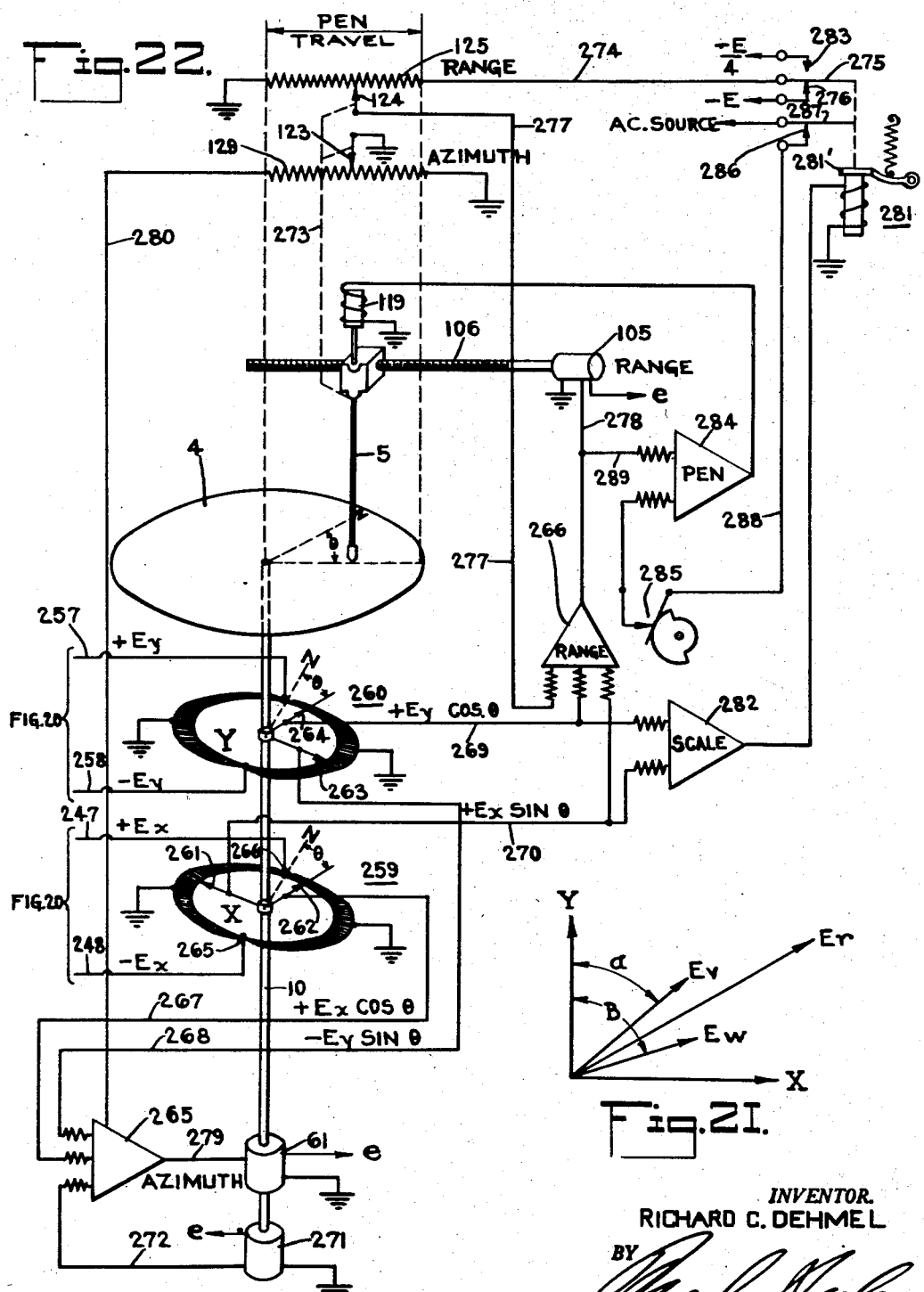

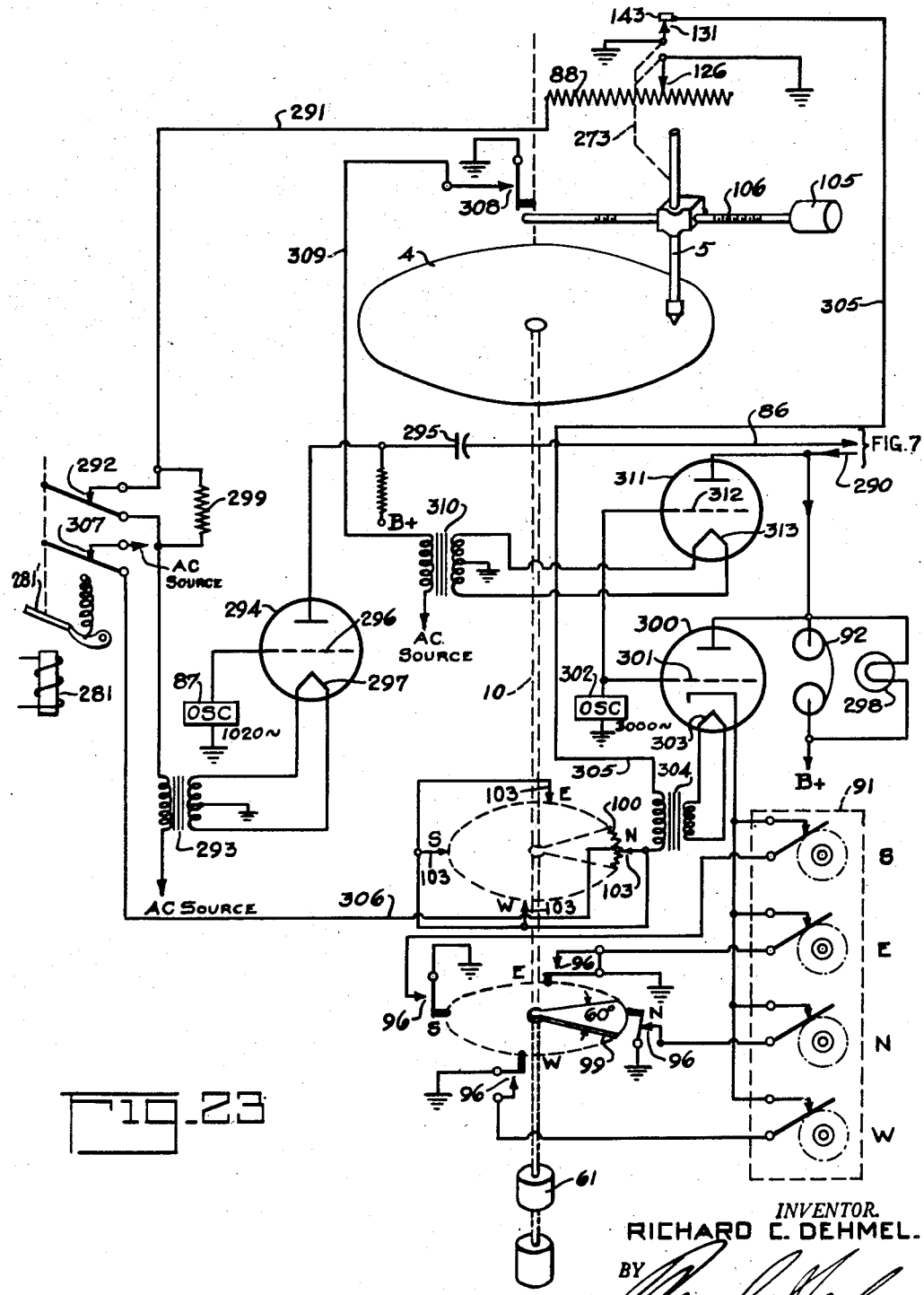

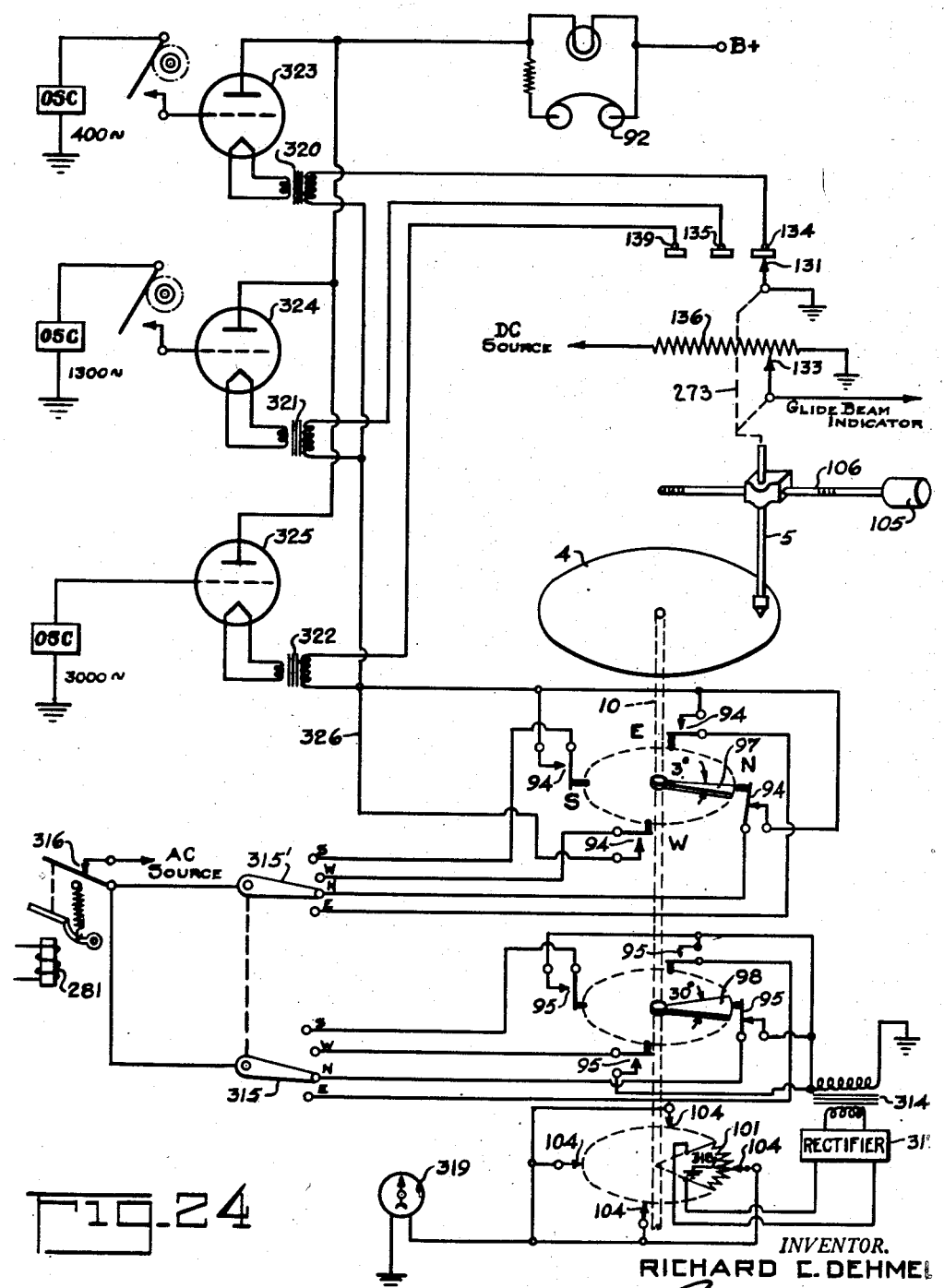

Patented Nov. 7, 1950

2,529,468

UNITED STATES PATENT OFFICE 2,529,468

RADIO RANGE NAVIGATION APPARATUS FOR TRAINING AIRCRAFT PERSONNEL

Richard C. Dehmel, Short Hills, N. J.

Application July 27, 1945, Serial No. 607,333

17 Claims. (Cl. 35—10.2)

This invention relates to aircraft training apparatus and particularly to ground trainers for simulating and recording flight maneuvers and for practicing navigation with respect to a simulated radio range.

A principal object of this invention is to provide an improved practical ground training apparatus for aircraft pilots that is efficient, compact and responsive to student control operation for precisely simulating and recording aircraft maneuvers and also for simulating the reception of radio range signals, including blind landing signals, marker signals, etc., according to the instant position of the simulated flight.

A further object of this invention is to provide improved control and recording apparatus for aircraft trainers that has particular application to a compactly designed ground trainer and that can readily be incorporated as a unit in the trainer structure so as to occupy for practical purposes a minimum amount of space.

A further object of this invention is to provide an improved signal controlling apparatus for facilitating adjustment of a simulated radio range beam pattern for representing the pattern of any radio range station, and for selectively introducing marker signals along any designated direction beam of the simulated radio station.

A further object of this invention is to provide an improved recording and control unit symmetrically and compactly designed around a central operating shaft, the longitudinal axis of which represents the simulated radio range station, and that may be mounted in a wall, such as, for example, in the fuselage nose portion, of grounded aircraft trainer structure.

In my Patent 2,366,603 granted January 2, 1945 for "Aircraft Training Apparatus," there is disclosed ground training apparatus for simulating flight maneuvers, including means responsive to the operation of aircraft controls for indicating flight conditions, recording the ground path of the simulated flight and simulating according to the instant flight position the reception of the radio range signals that would be received under actual flight conditions. In this apparatus a charting element is movable both in azimuth and in range, i. e., radial distance, from the simulated radio range station, by motive means that is energized according to simulated aircraft speed and direction. The movement in azimuth of said element is used to control signal apparatus for simulating the aforesaid radio range signals, such as, for example, the usual A and N signals or any other signalling system, such as Lorenz, British, Australian, the Navy Y G system and others, and its movement in range is used to control the volume of the signals and to introduce marker signals and the like.

According to the present invention, improved signal control and recording apparatus of this general character are combined in a compact and efficient arrangement that is particularly adapted for use in a ground trainer having a cockpit or station wherein the student operates aircraft controls to simulate flight maneuvers, to practice orientation by means of the simulated radio range signals and to chart automatically the simulated flight.

More specifically, the recording and signal control apparatus of the present invention is of the type having a polar coordinate reference system wherein one element is rotatable about a center representing the radio range station to indicate azimuth and another element is movable with respect to said center to indicate range, as disclosed, for example, in my copending application Serial No. 511,732 filed November 25, 1943, now Patent No. 2,475,314 dated July 5, 1949, for "Navigation Apparatus for Aircraft and Training Devices."

The invention will be more fully set forth in the following description referring to the accompanying drawing, and the features of novelty will be pointed out with particularity in the claims annexed to and forming a part of this specification.

Referring to the drawings:

Fig. 1 is a front elevational view of a ground trainer embodying the present invention;

Fig. 1—A is a front elevational view of the signal controller and recording unit shown at Fig. 1;

Fig. 2 is an elevational end view, partly in section, of the signal controller and recording unit, taken along the line 2—2 of Fig. 4;

Fig. 2—A is an exploded view showing in detail beam arm structure of Fig. 2;

Fig. 2—B is an enlarged sectional view of apparatus shown in Fig. 2;

Fig. 3 is an enlarged view, partly in section, of a shaft assembly of Fig. 2;

Fig. 6 is an enlarged detail view of the beam arm latching and adjusting means of the aforesaid unit;

Fig. 7 is a diagrammatic illustration of the A and N signal potentiometer arrangement of the aforesaid unit;

Fig. 8 shows schematically the potentiometers, voltage resolvers and radio range marker signal contacts associated with the azimuth control of the aforesaid unit;

Fig. 9 is an elevational view, partly in section, of the recorder pen and range controlling mechanism of the aforesaid unit with the front cover plate removed;

Fig. 10 is an elevational view of the marker contact panel forming part of the front cover of Fig. 9 as viewed from the rear;

Fig. 11 is an elevational end view, partly in section, of the pen and range mechanism of Fig. 9;

Fig. 12 is a plan view of the pen and range mechanism, partly in section, with the top cover removed;

Fig. 13 is a detailed view showing in elevation the pen carriage of the pen and range mechanism as viewed from the rear;

Figs. 14 and 15 illustrate details for adjusting azimuth setting of apparatus shown in Fig. 4;

Figs. 16 and 17 are enlarged detailed views of an insulated A and N potentiometer contact;

Figs. 18 and 19 are enlarged detailed views of a ground A and N potentiometer contact;

Fig. 21 is a diagram illustrating vectorially air speed and wind velocity;

Fig. 22 is a schematic illustration of voltage resolvers and recording mechanism of the aforesaid signal controller and recording unit;

Fig. 23 is a schematic illustration of the radio range signal and marker arrangement of the aforesaid unit, partly with reference to fan and Z markers; and Fig. 24 is a similar schematic illustration with particular reference to the outer, middle and inner landing markers and the localizer beam.

Figure 1:
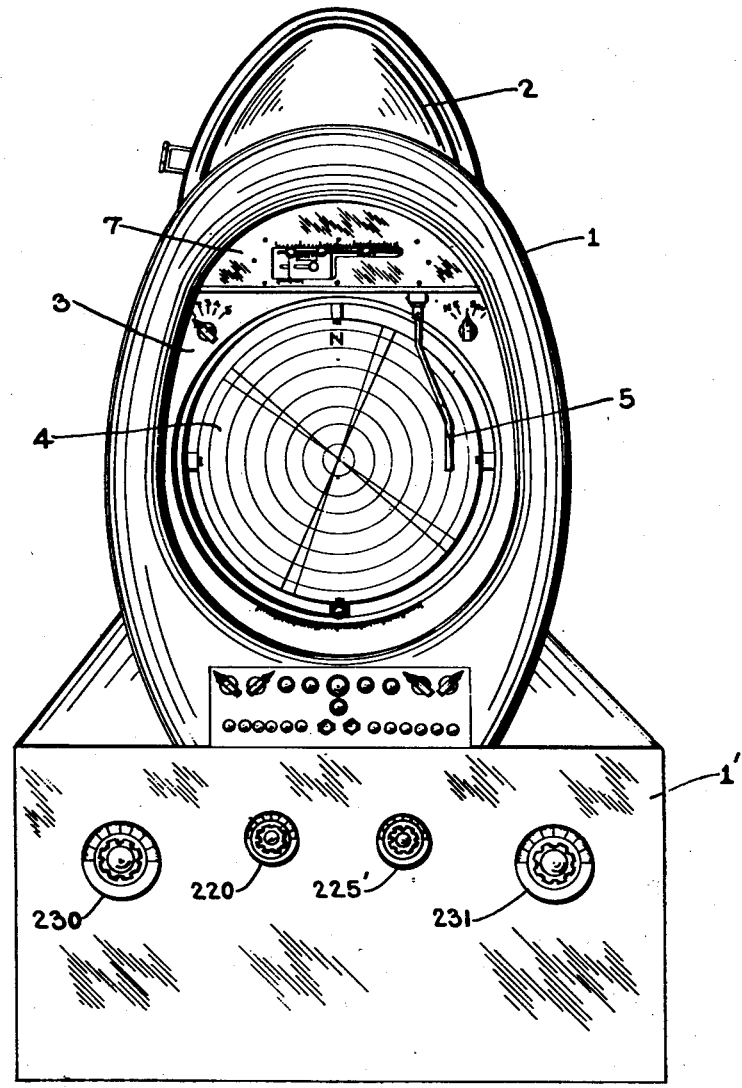

Referring more particularly to the drawings, Fig. 1 illustrates by way of example the physical appearance of one form of training apparatus to which the present invention can advantageously be applied. This particular apparatus is a ground trainer for aircraft pilots and comprises an enclosing structure 1 simulating in form the fuselage of a flight machine and forming a cockpit or cabin 2 within which the student pilot operates simulated aircraft or flight controls. The fuselage may be movable or stationary, as hereinafter pointed out. The flight controls, such as the stick, rudder and throttle may be of the character disclosed in my above identified patent and are not shown since a detailed description thereof is unnecessary for a complete understanding of the present invention. It is sufficient to state that electro-responsive means are operable by the flight controls for simulating various flight conditions, such as air speed and direction.

The improved signal and recording apparatus herein disclosed is mainly incorporated in a compactly designed unit 3 which can be conveniently mounted in the front or nose of the trainer as illustrated so that the chart 4 and tracing pen 5 are accessible and plainly visible to an instructor but cannot be seen by the student during practice. The electrical apparatus and circuits, as well as other equipment associated with the unit 3, are completely contained within the trainer fuselage 1 and base 1' so that the trainer itself constitutes an integral assembly.

Referring more particularly to Fig. 1—A which illustrates the front or chart side of the unit 3, the circular chart 4 is arranged to rotate about its center 6 to represent change in azimuth of the simulated flight and the tracing pen arm 5 is arranged to move transversely across the chart along a horizontal path to represent the range, i. e., distance, of the simulated flight from the chart center 6. The marker or pen 5' itself represents the instant position of the flight with respect to a radio range station represented by the chart center 6. The pen arm 5 is operated and controlled in a manner hereinafter described by the pen and range control assembly 7 so that the pen travels but half way across the chart. When the pen reaches the center 6 and the flight path of the trainer is unaltered, the chart is rotated through 180° and the direction of the pen is reversed by control means hereinafter described so that the chart shows a substantially continuous trace across the center when a practice flight is directed over the radio range station. An adjustable azimuth scale 8 is arranged to cooperate with the chart in a manner hereinafter set forth.

The simulated radio range signals received by the student also correspond to the instant flight position indicated on the chart and the usual marker signals can be simulated along any selected direction beam of the radio station. These and other features of the charting and signal apparatus will be described later in connection with a more detailed illustration of the invention.

Referring specifically to the unit 3, Figs. 2 to 6 inclusive, a box-like supporting frame 9 has mounted centrally and transversely thereof a rotatable shaft 10, the longitudinal axis of which determines the chart center 6 previously referred to. The shaft 10 is supported on ball bearings 15 and 15' within a sleeve-like member or bushing 12 that is mounted on the rear section 11 of the frame. A flange portion 13 of the bushing is clamped at 14 to a peripheral flange 13' defining an opening 11' in the rear wall section through which the rear end of the shaft extends. An assembly generally indicated at 16 consisting of electrical apparatus associated with the signal control system, etc. is also mounted on and concentrically about the bushing 12. For cooperating with the assembly 16 the shaft 10 carries a relatively movable assembly generally indicated at 17.

Referring to Figs. 2, 2—B and 3, the shaft 10 has mounted thereon within the bushing 12 a conductor terminal assembly 18 and a slip ring assembly 19 hereinafter described, and a disc 20 that is pinned to the shaft at 20'. The disc 20, Figs. 2 and 4, carries a 3-forked arm 21 that is bolted to the disc at 22 and that supports the assembly 17.

The assembly 16 is mounted on the bushing 12 in the following manner: The bushing 12 is provided with an annular flange 23 to which is bolted at 24 a pair of annular members 25 and 26. The member 25 is formed as an enlarged collar fitted on the bushing 12 so as to extend coaxially of shaft 10. The member 26 is formed as a flanged disc and is similarly positioned on the bushing 12. The members are suitably formed as castings and arranged respectively to support the electrical apparatus 16 cooperating with the shaft assembly in a manner hereinafter described.

Figure 4:
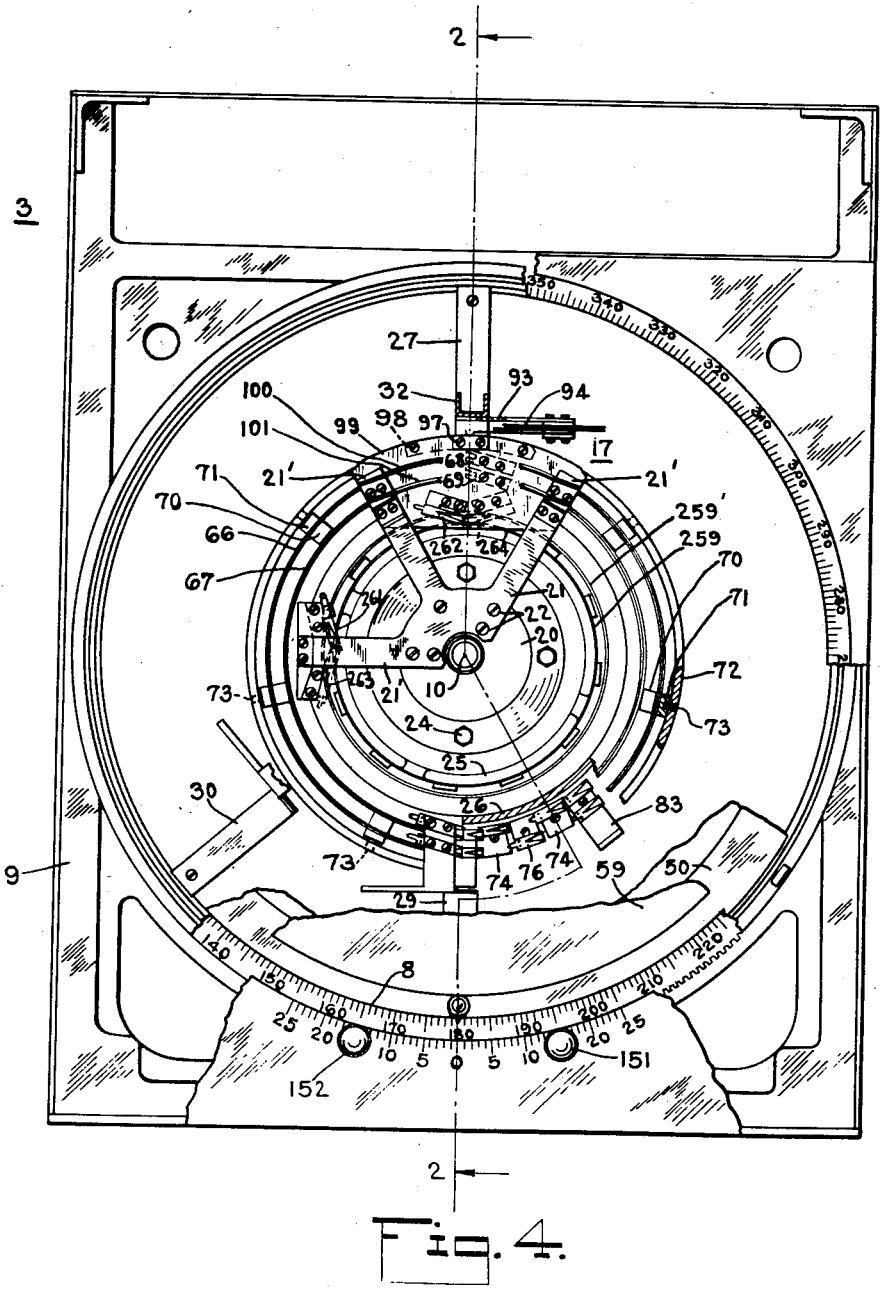
Fig. 4 is a front elevational view with the chart holder removed, partly in section, of the unit shown in Figs. 1 and 2.

Four angularly movable arms representing respectively the radio station on-course direction beams are mounted on the fixed member 26. These beam arms are shown at 27, 28, 29 and 30 in Fig. 5, whereas Fig. 2 shows but the arms 27 and 29. Except for minor differences in dimensions the beam arms are similar in construction and a detailed description of one, such as arm 27, will therefore be sufficient. The arm 27 comprises a hub ring 31 that is rotatably mounted on a hub portion 26', see Fig. 2, of the member 26 between said member and the bushing flange 23. The hub bearing rings for the other beam arms 28, 29 and 30 are shown at 35, 36 and 37 respectively, Fig. 2—A. A radially extending portion 32 forming part of the beam arm, Figs. 2 and 4, is bent at a right angle so as to overhang the shaft assembly 17. The outer extremity 33 of the beam arm extends radially away from the shaft 10 and is provided with a latch 34, Figs. 5 and 6, for holding it to the stationary frame 9. In the interest of clarity, duplicate elements are not shown in all instances in Fig. 2 since their positions are clearly indicated by other corresponding elements.

The beam arms are individually adjustable with respect to adjacent ones through approximately a quadrant but considerable flexibility is provided for changes in the complete beam pattern. Each beam arm is provided with means for providing a limit stop with respect to other beam arms so as to avoid overlapping and confusion during adjustment of the arms. The arrangement also provides for practical limitation of the maximum angle for any one sector.

As indicated by Fig. 2—A, each of the arms 28, 29 and 30 is limited by its offset stop pin to a predetermined angular movement with reference to the adjacent arm nearest the North reference arm 27. Specifically, the stop pins 35a, 36a and 37a positioned in the ring notches 36b, 37b and 31b respectively limit relative movement of adjacent beam arms to approximately a quadrant. Angular movement of the reference or North beam arm 27, and hence the other arms, is limited by a pair of stops 38, Figs. 2—A and 5, secured to the fixed bushing flange 23 in the path of pin 39. The extension 39' of this pin is positioned in the path of arms 30 and 29 and the offset lugs 35b of ring 35 to block movement of any other beam arm past the North reference beam arm 27. It will therefore be seen that each beam arm is angularly adjustable in azimuth about a center representing the location of a radio range station for simulating the pattern of that station.

A convenient arrangement for adjusting the beam arms from the front of the trainer without disturbing the chart apparatus will now be described. Each beam arm is provided with a latch 34 for engaging a notched ring 41, Fig. 5, secured by lugs 42 to the frame 9. The latch shown in detail in Fig. 6 is mounted on a pivot pin 43 secured to the beam arm extension 33. The latch is biased by a spring 44 in clockwise direction as viewed in Fig. 6 so that the detent portion 45 slides into a notch in the ring 41 thereby holding the beam arm in a fixed position. Release of the latch and angular adjustment of the arm is accomplished by a knob and plunger arrangement 46 and 47 carried at the periphery of a circular metal disc 48, Fig. 2, that is in turn rotatably supported on the shaft 10 by a ball bearing 49. The disc 48 is provided with a transparent plastic ring 50 secured to the peripheral flange thereof and arranged so that the outer end of each beam arm can be seen from the front of the trainer. A felt gasket 51 provides a snug, dust-proof fit between the frame and ring 50 without interfering with rotation of the disc 48 so that a protective diaphragm or wall for the apparatus in the unit is thereby provided.

As shown by Fig. 6, the ring 50 has an aperture 52 in which a guide bushing 53 for the plunger 47 is mounted. The plunger 47 and a pin 54 secured to the latch 34 are positioned so that when the plunger and pin are circumferentially aligned at the arm aperture 54', the knob 46 can be pushed forward against light spring bias to release the latch from the frame. With the knob held in this forward position, the disc 48 can then be rotated carrying with it the beam arm due to interlocking of the plunger portion 55 and the arm portion 33. When the beam arm has been rotated to its proper position as determined by the azimuth scale 8, Figs. 1A and 4, the knob 46 is released and the latch pin 54 and detent 45 under bias of spring 44 return to the latching position shown in Fig. 6.

During this adjusting operation the apparatus may be rendered inoperative by the opening of a limit switch 56 that is normally closed by a cam portion 57 secured to the plastic ring 50. When the disc 48 has been rotated back to the initial position where the knob 46 does not interfere with the operation of the pen arm 5, the cam 57 engages a plunger roller 58 so as to depress it and close the switch 56.

The chart holder itself comprises a metal disc 59, Fig. 2, secured to the outer end of shaft 10 for rotation therewith. A plurality of suitable chart clips 60, Fig. 6, are provided around the periphery of the chart holder. As previously stated rotation of the chart represents change in azimuth of the simulated flight from a radio range station.

Figure 5:
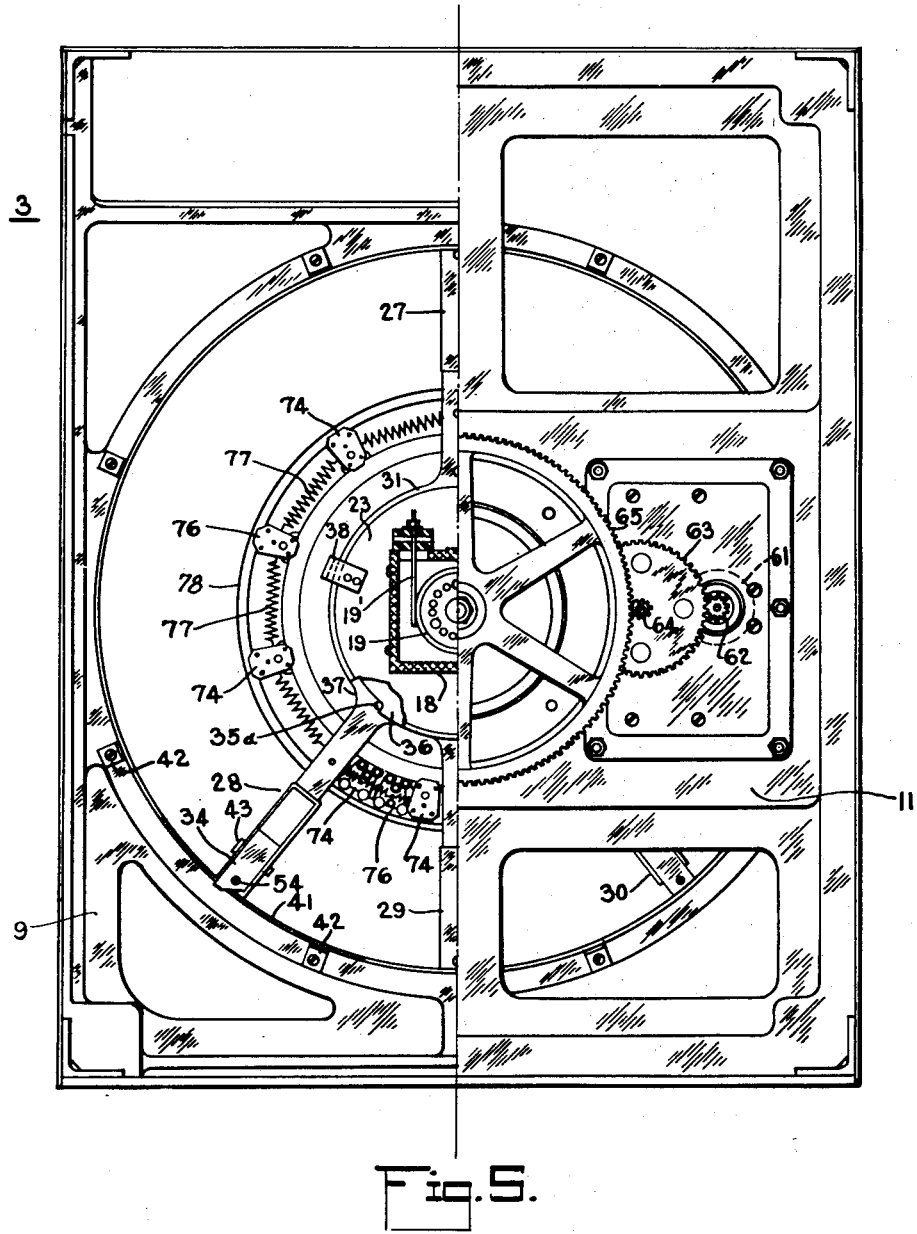
Fig. 5 is a rear elevational view, partly in section, of the aforesaid signal controller and recording unit.

The shaft 10, together with the shaft assembly 17, 18 and 19 and the chart holder 59 is rotatable by a motor 61, Fig. 5, through the gearing 62, 63, 64 and 65, the main drive gear 65 being secured to the shaft 10, Fig. 2. The motor 61, which is bolted to the rear wall 11 within the unit, is controlled in a manner hereinafter described to simulate changes in the azimuthal position of the flight.

In addition to controlling the chart, the shaft 10 also controls attenuation apparatus for radio range signals. This apparatus includes two resistance elements or potentiometers 66 and 67, Figs. 2B and 7, carried by the fixed annular member 26. The potentiometers 66 and 67 are designated the "A" and "N" potentiometers respectively and each constitutes a resistance wound on a ring of insulating material as diagrammatically indicated in Figs. 7 and 8. The resistance may be so wound as to give either a uniform or sinusoidal effect. The potentiometers are mounted coaxially of the shaft 10 and overhang the member 26 at opposite sides so that the potentiometer edges adjacent to the movable contact assembly 17 are arranged to be engaged by wiping contacts 68 and 69 respectively of said assembly and the potentiometers edges at the opposite sides thereof are arranged to be engaged also by wiping contact structure hereinafter described associated with the respective beam arms. The potentiometers are suitably held in position by means of a plurality of adjustable spacers 70 and 71, Figs. 2B and 4, and a retaining ring 72 that is provided with peripherally spaced screws or the like 73 for clamping the potentiometers between the spacers and the supporting member 26.

The contact structure associated with the A and N potentiometers is connected to the potentiometer circuits in essentially the same manner as disclosed in my above identified Patent Number 2,366,603, referring particularly to Fig. 34 thereof. In the present application I have provided improved means for not only adjusting the on-course beam contacts, but also for automatically adjusting therewith the relative positions of the contacts connected to the signal tone oscillator and the ground contacts. It will be apparent that the slider contacts 68 and 69 are adjusted with respect to the potentiometer resistances in accordance with simulated changes in azimuth as described in the above patent. The relative positions of the contacts engaging the opposite sides of the potentiometers however are fixed except when the beam pattern is being adjusted. There are three contacts between each pair of beam arms, i. e., two ground connected contacts 74 for engaging one potentiometer and an oscillator connected contact 76 for engaging the other potentiometer as diagrammatically illustrated by Fig. 7. These contacts constitute block-like units that are slidably guided on the supporting member 26 in a form of raceway so as to move freely on the periphery of said member, Figs. 2 and 5. The contacts are proportionally spaced with respect to each other and the beam arms by the interconnecting springs 77 which may be placed in either tension or compression for maintaining the contacts in their proportionate spaced relation in the sector defined by the two adjacent beam arms, such as the beam arms 27 and 28. The outer peripheral guide for the contacts 74 and 76 comprises a ring 78 that is held in fixed concentric relation to the shaft 10 by positioning guides 79 secured to the four beam arms respectively. The contact 76 for example in Fig. 2B includes an insulating block 80 secured to the potentiometer side of the contact and provided with a contact element 81 for engaging the potentiometer 66.

Figs. 16 to 19 inclusive illustrate the detail construction of the A and N potentiometer contacts including the contact carrier assembly. Figs. 16 and 17 show a contact corresponding to the oscillator contacts 76 of Fig. 7 and Figs. 18 and 19 illustrate a contact corresponding to the ground contacts 74 of Figs. 16 and 17 comprises a pair of metal plates 76a held in spaced relation by a bushing 76g and bolt 76b and provided with four rollers 76c for operation in the race-way above referred to. The plates 76a are also interconnected by a pin 76d to which can be connected the springs 77. An insulating block 80 on which is mounted a spring contact 81 for engaging one of the potentiometers in the manner above referred to is secured to the contact carrier assembly by means of the bolt 76b. A conductor pin 76e mounted in an insulating bushing 76f is arranged to make electrical connection with the terminal of contact 81.

The grounded potentiometer contact 74 shown by Figs. 18 and 19 is generally similar in construction to the contact above described in respect to the contact carrier which also comprises a pair of spaced metal plates 74a and a set of guide rollers 74c. Since the contact 74 in this case is grounded, a metal block 80' to which the spring contact element 81' is riveted, is clamped in conducting engagement with the contact carrier by means of the assembly bolt 74b. Since the metal rollers 74c are likewise electrically connected to the carrier assembly it will be seen that the contact element 81' may be grounded directly to the frame of the unit 3 through the metal ring 78 and the main supporting flange 26, Fig. 2.

The other contacts are similarly constructed, except of course for providing contact with potentiometers 66 or 67, as the case may be. Each beam arm is provided with a contact 83, Figs. 2B and 8, for interconnecting the potentiometers at the desired points of equal signal intensity for defining the simulated on-course signal. The contact 83 comprises an insulating block 84 secured to the beam arm, such as 27, and provided with a contact element 85 arranged to bridge the potentiometers for establishing equi-potential points at the on-course positions of the potentiometer.

The attenuation of the radio range signals by means of the A and N potentiometers and the coding and reception of signals is described in detail in my aforesaid patent and need not be further described in this specification other than to refer to Fig. 7 which diagrammmatically illustrates the more essential elements of the range potentiometer signal system. The two oscillator contacts 76 of each potentiometer are connected respectively at the midpoints of a pair of diametrically opposite sectors, such as the A quadrants of one potentiometer, and the N quadrants of the other potentiometer. All the oscillator contacts are connected through a common conductor 86 to one terminal of an oscillator 87 having a suitable audio frequency for the signal tone. The other oscillator terminal is grounded through a variable resistance 88 for the tone return current. The variable resistance 88 is controlled by the pen mechanism 7, Fig. 1, in a manner hereinafter described for varying the magnitude of the signal current in accordance with the range of the simulated flight from the radio range station. The potentiometer slider contacts 68 and 69 are connected through conductors 68' and 69', slip rings and brushes 19 and 19', Figs. 3 and 5, and conductors 89 and 90 respectively to a coding cam unit or keyer 91 for the range and station identification signals. A receiver 92, which may be either aural or visual, is connected at 290 to the coding unit 91. If desired, a plurality of stations having different identification signals may be simulated by means of a selector switch for transferring the receiver to different station identification circuits, such as stations 1 to 5, Fig. 1A.

Bearing in mind the superposed relation of the potentiometers, Fig. 7, the unified movement of the slider contacts 68 and 69 is seen to vary the voltage selected by the brushes in the respective A and N tone circuits so as to simulate in accordance with the position in azimuth of the shaft 10 equal intensity (on-course) A and N signals, and weak and strong off-course signals according to radio reception in practice. By reason of the adjustable beam arms and the automatic adjustment of the spring positioned potentiometer contacts associated therewith the signals of each sector can be properly simulated with reference to the angular signal distribution in that sector. This important feature is made possible since there are no fixed connections to the potentiometers that would limit the adjustment of the beam and sector pattern or interfere with the proper angular distribution of the A and N signals in any sector.

In actual practice there is in reality no "dead" sector wherein a radio range signal cannot be picked up, i. e., the signal, while faint can nevertheless be picked up by increased receiver volume control, although for practical purposes such a "dead" sector may be simulated in the manner illustrated by Fig. 7 by grounding, for example, the N contacts 74 at opposite sides of an oscillator connected A contact 76. As previously explained, referring specifically to the lower A quadrant of Fig. 7, the A signal is a maximum when the on-course contact is midway between the grounded contacts 74 whereas the N signal sector between the aforesaid grounded contacts 74 is dead.

For the purpose of simulating conditions in actual practice, each grounded connection of the contacts 74 may include a resistance 74' for enabling the student to pick up a faint signal, such as for example, the N signal above referred to by increasing the receiver volume control when the corresponding on course contact is in a so-called dead sector. This is of course equivalent to interconnecting the dead sector contacts by a resistance in shunt relation to that part of the potentiometer resistance so that the on-course contact takes off a small oscillator current from the aforesaid part of the potentiometer. It will be understood of course that a symmetrical arrangement will be used for all contacts in either case above referred to.

In an alternative form, a true cosinusoidal field strength pattern may be obtained by winding each A and N potentiometer on a contoured card so as to give a sine resistance distribution. In this arrangement the contacts 74 and 76 in each sector are fixed and coincident so that the oscillator current at each contact 76 can be controlled to give the desired field strength pattern. By such current control the beam angles may be shifted as in an actual radio range.

In addition to the A and N range signals, I have provided means for simulating radio marker signals, including fan marker, localizer and landing markers. These markers are spaced at varying distances from the landing field and are located along a direction beam. For example, the fan marker is located some distance from the station and subtends an angle of approximately 60°, i. e., 30° on either side of the direction beam. The localizer marker which is located much nearer the station subtends an angle of approximately 30° whereas the landing marker which is adjacent to the landing field subtends an angle of approximately 3°.

The contact structure for simulating these markers is mounted on each beam arm so that any direction beam of a particular station can be selected as the approach to the landing field. The operating means for the aforesaid contacts is carried by the shaft 10, i. e., assembly 17, Fig. 2, so that the operation of the marker contacts depends upon the position in azimuth of the simulated flight. While this unitary arrangement is not necessary, it is convenient for most ranges.

Specifically the marker contact arrangement comprises a plurality of spring biased contacts, suitably secured as by a strip 93, Fig. 4, to the overhanging portion 32 of the beam arm. A landing marker contact 94, localizer contact 95 and fan marker contact 96, Figs. 2B and 8, are mounted in alignment on the strip 93 so as to be operated by the insulating cam members 97, 98 and 99, respectively of the assembly 17. The fan marker cam 99 constitutes the support for the other cam members and comprises an insulating segment subtending an angle of approximately 60° between the arms 21' of the support 21. The cam 97 for the landing marker contact 94 is secured to the member 99 at the mid section thereof and subtends an angle of 3° whereas the localizer contact cam 98 secured to the opposite side of the member 99 subtends an angle of 30° from the axis 10. Accordingly, the contacts 94, 95 and 96 will be closed when the instant position in azimuth of the simulated flight is within the limits of the simulated markers provided of course the instant flight position corresponds to the marker range from the radio station. The simulation of range is accomplished by the mechanism controlling the chart pen previously referred to and which will be presently described.

The attenuation of the marker signals, specifically the fan marker and localizer signals, is simulated by means of resistance 100, 101, Figs. 2 and 8. These resistances are mounted on an insulating member 102 secured to the member 99 and are arranged to be engaged by fan marker and localizer contacts 103 and 104 respectively carried by the beam arm. As shown in Fig. 8 the resistance 100 which is for attenuating the fan marker signal subtends an angle of approximately 60° from the axis 10 and the localizer resistance 101 subtends an angle of 30° therefrom. The fan marker signal, for example, is weakened when the simulated flight position is off center, such as at the outer fringe of the marker radio pattern.

The unit 7 for operating the chart pen includes a motor 105, Fig. 9, that is responsive to flight operation for simulating the range of the simulated flight from the station. The motor 105 is connected to a lead screw 106 that is suitably journalled in the unit 7 for moving a pen carriage 107 along a rectilinear path. For this purpose the lead screw is provided with a travelling nut 108, Fig. 12, that is connected by means of a bracket 109 to the carriage member 110, Fig. 11. The carriage is guided for reciprocal movement along the longitudinal axis of the unit 7 by means of two parallel rods 111 and 112, see Fig. 13, cooperating with three guide rollers 113, 114 and 115 mounted on the rear side of the member 110. Each roller is provided with a roller bearing 116, Fig. 11, on a stub shaft 117 secured to the member 110.

Under certain conditions hereinafter described, it is desirable to operate the chart pen so that it traces a dotted line instead of a full line. For this purpose, one of the guide rods for positioning the pen carriage member 110 is oscillated by means of a solenoid 119 so that the chart pen is periodically lifted from the chart. The upper guide rod 111 is eccentrically mounted on the pivots 118, Fig. 9, and is connected by means of a crank 120 to the solenoid plunger 121. The plunger 121 is biased by a spring 121' so that periodic operation of the solenoid results in eccentric oscillation of the rod about its longitudinal axis. This causes tilting of the member 110 about the fixed lower guide rod 112 in a clockwise direction as viewed in Fig. 11 and this movement is communicated to the pen arm 5 through the pivot support 122, so as periodically to lift the pen away from the chart.

When the pen arm is in an interfering position during adjustment of the beam arms, it is lifted manually through approximately 90, where it is held by a resiliently biased interlocking arrangement 122a of the pivot pin 122b and support 122, Fig. 9. If desired, limit or control switches 108a and 108b operable by the travelling nut 108 may be provided at opposite ends of the lead screw.

The carriage 107 also has contact structure including contacts 123, and 124 and 126 mounted on the rear side, Fig. 13, for cooperating with potentiometer resistances 129, 125 and 88 respectively, Figs. 9 and 11. The resistances constitute uniformly wound strip resistances mounted in the insulating bars 127 and 128 which are in turn secured to brackets 130, respectively.

At the opposite or front side of the carriage 107, contacts 131 and 131' are mounted for cooperating with relatively fixed marker signal contacts 134, 135 and 139 respectively, Figs. 10, 11 and 12, which are adjustably mounted on an insulating plate 137 secured to the front panel 138 of the unit. These fixed marker signal contacts can be adjusted to represent different range distances from the landing field as indicated on the front panel of the unit, Fig. 1.

For example, the contacts 134, 135 and 139, Figs. 10 and 12, are connected through the slots 145 and 146 to adjusting knobs 140, 141 and 142 respectively on the front side of the panel for representing "outer," "middle" and "inner" markers respectively. The middle marker contact 135 is offset to avoid crowding. A fan marker contact 143 provided with an adjusting knob 144 is also positioned a suitable distance from the simulated radio range station. The contact units are suitably guided in grooves 145' and 146' formed in the insulating block 137, Fig. 10, and the adjusting knobs also function as set screws to position the marker contacts according to chart scales 147 and 148, Fig. 1A.

The carriage lower contact 133 is in sliding engagement with a resistance element 136 which is mounted on the block 137 and constitutes a potentiometer resistance for the simulated glide path. As shown by Figs. 1A and 10 the resistance 136 which represents the landing field glide path is connected to the slide 149 and can be bodily moved along a limited rectilinear path by movement of the slide so as to shift the position of the landing field. The slide is adapted to be shifted and locked in position by a set screw knob 150.

When the simulated landing field is shifted to an extent indicated on the fixed scale 149', the new positions of the marker contacts are located by means of the scale 148 carried by the slide 149. This scale may conveniently be calibrated in thousand-feet units and the fan marker scale 147 calibrated in miles.

The azimuth scale 8, Figs. 1A and 4, is adapted to be rotated for any desired orientation by means of an adjusting knob 151 and to be locked in such position by a set screw 152. The adjusting means, Fig. 14, comprises a stub shaft 153 mounted in the frame 9 having a pinion gear 154 arranged to mesh with a ring gear 155 on the scale 8 to that the scale can be adjusted by rotation of the knob 151. The locking means, Fig. 15, comprises a screw 156 provided with a collar 157 and threaded in the frame 9 so that the knob 152 can be operated as a set screw to clamp the scale 8 to the frame.

The apparatus so far described is operable essentially by two motors, namely the azimuth motor 61 which rotates the assembly of shaft 10 including the chart 4, and the range motor 105 which moves the travelling pen carriage assembly 107 along a rectilinear path with respect to the center of the chart which represents the radio range station. The means for controlling the operation of the azimuth and range motors which together indicate on the chart the instant position of the simulated flight will now be described with reference to Figs. 20 and 22.

The flight trainer apparatus is not completely illustrated since a detail description thereof is unnecessary for a thorough understanding of the present invention. The simulated flight controls may, for example, control an air speed meter that may be operated by motor responsive to simulated air speed and a compass responsive to the simulated heading of the aircraft as described in my above identified patent. These two factors, namely velocity and direction, determine the instant position of the simulated flight, disregarding for the moment the effect of wind drift.

Figure 20:
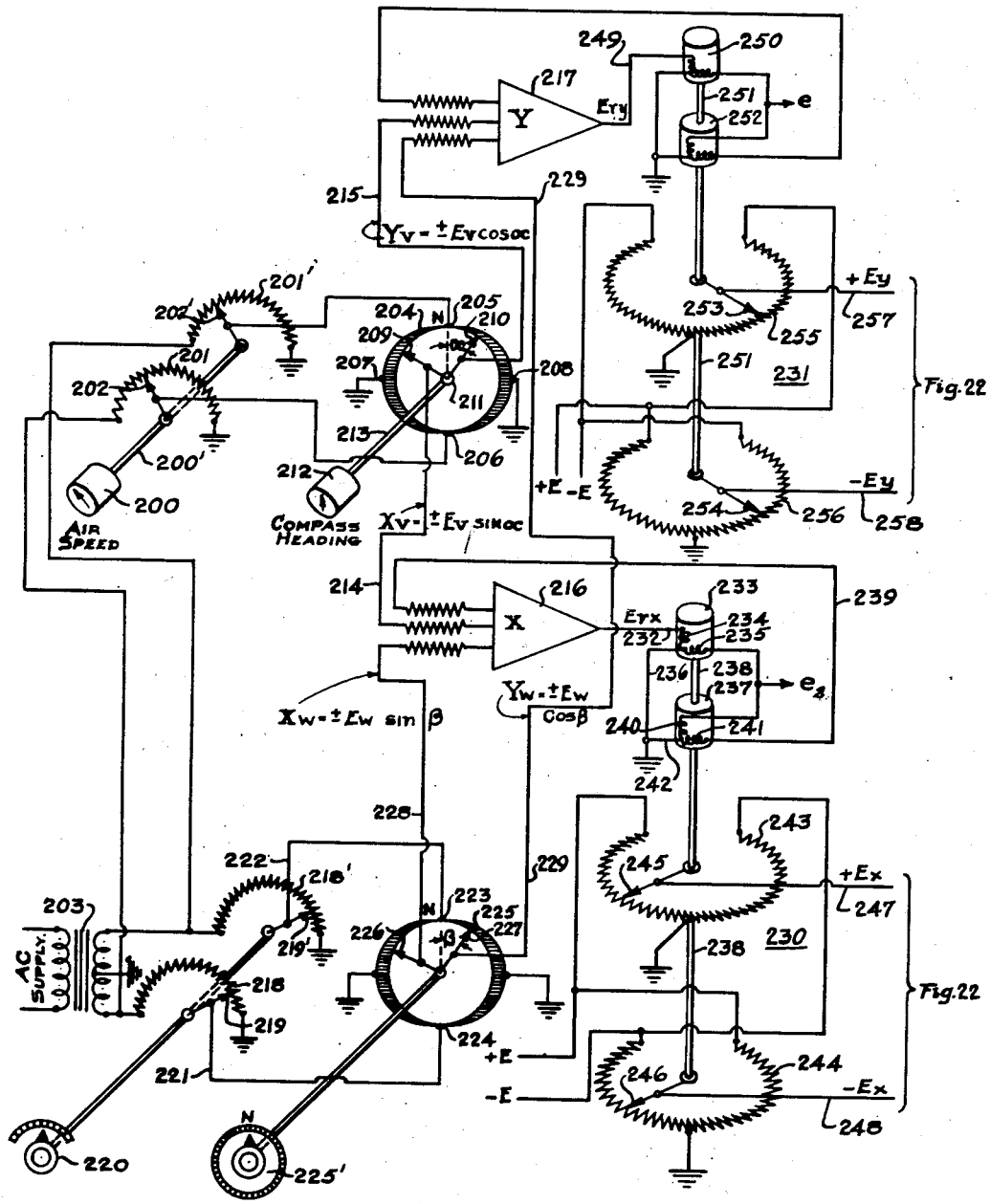
Fig. 20 is a schematic illustration of voltage resolving and integrating means for obtaining voltage components representing combined air speed and wind drift.

Referring to Fig. 20 the air speed meter 200 is operatively connected to a pair of potentiometers 201 and 201' for deriving A. C. voltages corresponding to the simulated instant air speed. The meter is shown as connected by a shaft 200' to a pair of slider potentiometer contacts 202 and 202'. In practice a torque amplifier would be interposed between the meter and contacts when it is desired to operate the contacts from an actual air speed meter. One pair of terminals of the potentiometer resistances is connected to the secondary winding of an A. C. supply transformer 203 and the other terminals are grounded as indicated.

It will be noted that the slider contacts 202 and 202' take off potentiometer voltages whose instantaneous values are of equal magnitude and of opposite phase. The slider contact voltages are led to the terminals 205 and 206 of a sine-cosine resolver 204, the other quadrant terminals 207 and 208 of which are grounded. It will therefore be seen that instantaneous potentials of $\pm E_v$ and $\mp E_v$ are applied respectively at the resolver terminals 205 and 206. The resolver is provided with a pair of sliding contacts 209 and 210 rotatable in fixed spaced relation of 90° about the center 211 of the resolver for deriving voltages from the potentiometer windings in a manner well known in the art.

For the purpose of deriving voltages representing Cartesian coordinate values of the instant flight position, a device 212 such as a simulated compass representing the heading, i. e., angle $\alpha$, of the aircraft from the North reference direction, is coupled through an operative connection 213 to the contacts 209 and 210 so as to orient these contacts in accordance with the compass reading. The contacts 209 and 210 are insulated from each other and are connected respectively to conductors 214 and 215 leading to the amplifiers 216 and 217 respectively. In the position shown the voltage derived at the contact 209, representing the X coordinate value is $$X_v = \pm E_v \sin \alpha$$

and the voltage derived at the contact 210 representing the Y coordinate value is $$Y_v = \pm E_v \cos \alpha$$

These voltages however represent the instant position of flight only in the absence of wind drift so that the X and Y components of wind drift must also be obtained and combined with the aforesaid air speed velocity components.

To this end an alternating voltage also from the secondary winding of transformer 203 is applied to a pair of terminals of potentiometers 218 and 218' having a pair of coacting sliding contacts 219 and 219' arranged for similar and simultaneous movement with respect to the terminals of the potentiometers as in the case of the air speed potentiometers. The contacts may be adjustably positioned to represent wind velocity by a calibrated dial 220, for example, and are connected through conductors 221 and 222 to the terminals 223 and 224 of the wind drift resolver 225. The other quadrant terminals of the resolver are grounded as are the other terminals of the potentiometers 218 and 218' so that when the potentiometer contacts 219 and 219' are adjusted to represent wind velocity, and the 90° spaced contacts 226 and 227 of the wind drift resolver are adjusted by the dial 225' through an angle $\beta$ to represent wind direction, the voltages derived at the contacts 226 and 227 will represent the X and Y components of wind drift. The contacts 226 and 227 are insulated from each other and are connected to the conductors 228 and 229 respectively leading to the X and Y amplifiers 216 and 217. The voltage derived at the contact 226 representing the X coordinate value is $$X_w = \pm E_w \sin \beta$$

and the voltage derived at the contact 227 representing the Y coordinate value is $$Y_w = \pm E_w \cos \beta$$

Reference is made to the vector diagram shown by Fig. 21 which represents the simulated airspeed velocity as $E_v$, the aircraft compass bearing as angle $\alpha$ and the wind velocity as $E_w$ and its direction as angle $\beta$. The X and Y components of both the air speed and wind drift are electrically summed to represent the true instant components of ground velocity of the simulated flight by means of the summing amplifiers 216 and 217 respectively. This type of amplifier, including provision for "feed-back," is well known in the art and my invention is not limited to any specific arrangement thereof.

The output of the X and Y amplifiers 216 and 217 is applied to integrating apparatus for integrating with respect to time instantaneous values of the voltage components representing the instant flight velocity vectors. The X amplifier is associated with the integrator 230 and the Y amplifier is associated with the integrator 231. The output of the X amplifier, $E_{rx}$ which represents the X component of the resultant velocity voltage is led by conductor 232 to a motor 233 having two phase windings 234 and 235. The winding 234 is energized by the voltage $E_{rx}$ and the winding 235 is energized by a supply voltage $e_2$, the common junction of both windings being grounded by the conductor 236. For the purpose of stabilizing the motor 233 so that its speed accurately represents the output voltage of the amplifier, a generator 237 directly coupled to the motor shaft 238 is connected by conductor 239 to the amplifier input so as to introduce the well known effect of feed-back. The two phase windings 240 and 241 of the generator are respectively connected to the supply voltage $e_2$ and the amplifier conductor 239. The common junction of both windings is grounded by the conductor 242.

A pair of similar integrating resistances 243 and 244 are provided with aligned sliding contacts 245 and 246 respectively arranged to be driven by the motor shaft 238. The terminals of the integrating resistances 243 are connected to an alternating voltage source and the terminals of the integrating resistance 244 are also connected to a similar voltage source so that corresponding terminals of the two resistances have opposite instantaneous polarities. The midpoints of the integrating resistances are grounded as indicated so that in the position shown for example the voltage at slider contact 245 can be represented by $+E_x$ and the voltage at the slider contact 246 represented by $-E_x$, thereby defining the instant flight position in a Cartesian coordinate reference system.

As previously indicated these voltages represent integrated values of velocity with respect to time as expressed for example by the formula $$E_x \int_{t_1}^{t_2} E_{rx} dt$$

The voltages $+E_x$ and $-E_x$ at the slider contacts 245 and 246 are led by conductors 247 and 248 respectively to a voltage resolver hereinafter described, Fig. 22, for changing the reference voltages from a Cartesian to a polar coordinate system. The necessity for such a change in the present case will be apparent since the azimuth motor must be responsive to change in azimuth of the simulated flight with respect to the center of the chart and the range motor must be responsive to change in the radial distance of the flight from the center of the polar reference system, i. e., the radio range station.

The integrator 231 associated with the Y velocity amplifier 217 is essentially the same as the integrator 230 above described. The output voltage $E_{ry}$ is lead by conductor 249 to the two phase motor 250 which drives through its shaft 251 a feed-back generator 252 in the manner previously described. The motor shaft 251 also operates a pair of aligned slider contacts 253 and 254 associated with the integrating resistances 255 and 256 respectively. These integrating resistances have grounded center taps and are connected to a source of alternating current so that the corresponding terminals thereof have voltages of opposite instantaneous polarity. The four grounded positions of the integrators 230 and 231 together represent the position of the radio range station. In other words, when all four slider contacts of the integrators simultaneously engage the grounded connections, a zero position representing the center of the coordinate reference system is indicated. When the integrator contacts pass the aforesaid grounded connections, there is a reversal of instantaneous polarity for controlling the chart and pen motors as hereinafter described.

The voltages $+E_y$ and $-E_y$ at the slider contacts 253 and 254 are led by conductors 257 and 258 to a voltage resolver, Fig. 22, for changing to a polar coordinate system. Referring to Figs. 8 and 22, the X integrator conductors 247 and 248 are connected to an X sine-cosine resolver 259, and the Y integrator conductors 257 and 258 are similarly connected to a Y sine-cosine resolver 260 of the type previously described. The resolver 259 is provided with a pair of 90° spaced slider contacts 261 and 262, and the Y resolver 260 is likewise provided with a pair of similar slider contacts 263 and 264, both pairs of slider contacts being mounted on the common shaft 10 for simultaneous movement and arranged so that the contacts 262 and 264 of the X and Y resolvers are in alignment to represent the on-course position and the contacts 261 and 263 are 180° apart. For convenience of illustration in Fig. 8, the on-course marker contact structure is shown approximately diametrically opposite the on-course resolver contacts, instead of in alignment therewith. The shaft 10 corresponds to the azimuth shaft connected to the azimuth motor 61 and the chart 4 of the control unit previously described.

The structural arrangement of the X and Y sine-cosine resolvers 259 and 260 in the controller unit 3 is shown by Figs. 2B and 4. The resolvers each comprise resistance wire wound on an insulating sine card in a well known manner as diagrammatically illustrated by Fig. 8. The resistance cards are mounted between cylindrical insulating spacers and are held in position on the fixed supporting member 25 by retaining rings 259' and 260' respectively. As best shown by Fig. 2B, the resolver cards are of the same diameter and are spaced along the longitudinal axis of the shaft 10 so as to overhang a circumferential recess 25' in the supporting member 25. The resolver contacts make sliding contact engagement with the overhanging edges in the relationship previously described. The on-course contacts 262 and 264 of the X and Y resolvers respectively are carried by the insulating plate 99 of the movable azimuth assembly 17 and the other contacts 261 and 263 are carried by the horizontal fork 21' of the arm 21, Fig. 4, so as to be in 90° spaced relation to the on-course contacts. Although the structural arrangement of Fig. 4 shows the contacts 261 and 263 in alignment on the same arm due to a particular arrangement of the resolver resistances, it will be understood that the electrical relationship of the contacts to the resolver resistances corresponds to that shown in Figs. 8 and 22.

The conductors of the X integrator are connected to the quadrant terminals 265 and 266 of the X resolver, Fig. 22, and the other quadrant terminals are grounded as indicated so that in the instant position shown, for example, the voltage at the slider contact 261 is $E_x \sin \theta$, where $\theta$ represents the polar angle of the instant flight position, and the voltage at slider contact 262 is $E_x \cos \theta$. The Y integrator is similarly connected to the Y resolver so that in the position shown the voltage at slider contact 264 is $E_y \cos \theta$ and the voltage at slider 263 is $-E_y \sin \theta$.

The resolver voltages above referred to are used to control the azimuth motor 61 and the range motor 105 through the azimuth amplifier 265 and the range amplifier 266 respectively. The operation of the two motors is related so that each motor tends to set a position of equilibrium, which position corresponds to the instant position of the simulated flight in polar coordinates. In this respect the relationship between the voltage resolvers and the range and azimuth motors is generally similar to that described in my above identified application. The voltages $+E_x \cos \theta$ and $-E_y \sin \theta$ at the course contacts 262 and 263 of the X and Y resolvers respectively are led by conductors 267 and 268 to the azimuth amplifier 265, and the voltages $+E_y \cos \theta$ and $+E_x \sin \theta$ are also led by conductors 269 and 270 to the range amplifier 266. The apparatus is diagrammatically shown in a position of equilibrium at the angle $\theta$ from the North reference position.

For the purpose of preventing excessive overtravel of the azimuth motor 61 during rapid changes in the azimuth position, the azimuth motor is coupled to a generator 271 that is connected by a conductor 272 to the input of the azimuth amplifier 265 for introducing feed-back effect.

The output of the range amplifier 266 is governed by means of a range motor potentiometer 125 whose sliding contact 124 is mechanically connected as indicated at 273 to the travelling pen mechanism. The inner terminal of the potentiometer 125 is grounded and the other terminal is connected through a conductor 274 and relay contacts 275 and 276 to a source of alternating voltage $-E$. Accordingly the position of the slider contact 124 on the potentiometer determines the voltage that is led by conductor 277 to the input of the range amplifier. The range motor, which is connected to the output of the range amplifier by conductor 278, is adapted to rotate so as to move the potentiometer contact 124 to a position such that the voltage taken from the range potentiometer balances the other input voltages, that is, $E_y \cos \theta$ and $E_x \sin \theta$, of the range amplifier. The pen 5, which is moved simultaneously with slider contact 124 is then in a position representing the range of the simulated flight from the center of the chart.

The azimuth motor 61 is connected to the output of the azimuth amplifier 265 by conductor 279 and is adapted to rotate the resolver slider contacts to the angle $\theta$ position wherein the voltage $E_x \cos \theta$ at the contact 262 and the voltage $-E_y \sin \theta$ at the contact 263 balance each other at the input of the azimuth amplifier. For the purpose of compensating the azimuth motor amplifier as the range distance varies, the azimuth gain potentiometer 129 is provided with a slider contact 123 mechanically connected as indicated to the travelling pen mechanism so as to take a position representing that of the pen. The outer terminal of the potentiometer is grounded and the other terminal is connected by a conductor 280 to the azimuth amplifier for providing gain control is a well known manner. The gain of the azimuth amplifier is directly controlled by the position of the range controlled pen so that the azimuth motor may have more uniform response throughout variations in the range distances. This is necessary as the sensitivity of the azimuth motor otherwise decreases with range due to the decrease in the magnitude of the voltage components $E_x$ and $E_y$ and the resultingly smaller incremental voltage changes for a given change in azimuth. If uncorrected, this condition would cause over-sensitivity or "hunting" in the higher voltage range and sluggishness in the lower voltage range.

It is desirable to operate the pen 5 on two different scales, namely a normal scale whereby radial distances of approximately 100 miles or more can be represented on the chart, and a so-called expanded scale wherein the radial range of the chart can be made to represent approximately 25 miles so as to introduce with a greater degree of accuracy the various marker and landing signals.

The chart tracing of the simulated flight on the normal scale is a dotted line, whereas the trace on the expanded scale is a continuous line for the purpose of determining with greater convenience and accuracy the instant flight position. Assuming that the mechanism is operating on the long range normal scale, when the flight position comes within 25 miles, for example, of the radio range station means are provided for transferring the mechanism from the normal to the expanded scale, and vice versa, comprising a scale factor relay 281 and a scale changing amplifier 282 operated by predetermined change in voltage at the input of the range motor amplifier 266. The amplifier 282 consists of a suitable electron "trigger circuit"

such as a thyratron circuit that is adapted to "fire" at a predetermined voltage and to cut-off at a slightly lower voltage in a manner well known in the art.

When the input voltage from conductors 269 and 270 drops to a predetermined value as determined by the positions of the resolver contacts 261 and 264 indicating the instant flight position, the amplifier 282 cuts off and the scale factor relay is de-energized. The relay armature 281' thereupon moves upward under spring bias to open contacts 275 and 276 and to close contacts 275 and 283 thereby transferring the terminal conductor 274 of the range motor potentiometer to a potential of $$-\frac{E}{4}$$

instead of the normal range value of —E. As previously stated the aforesaid voltages are indicated as instantaneous values A. C. This change in voltage on the range motor potentiometer 125 causes the range motor 105 to operate four times as far for a given increment of change in the voltages $E_y \cos \theta$ and $E_x \sin \theta$, thereby increasing the scale factor of the chart by four times. As previously indicated, the range motor 105 is operated through the range amplifier 266 in a direction so as to move the contact 124 to a position on the range potentiometer so that the voltage taken from the potentiometer by conductor 277 to the input of amplifier 266 balances the combined input voltages at the input conductors 269 and 270 and the output of the amplifier is zero. It will be noted that the voltages at conductors 269 and 270 are not proportionately affected by the scale factor change. When this position of equilibrium is reached, the motor stops and the position of the pen then represents the instant range distance of the simulated flight from the radio range station.

The apparatus is shown in Fig. 22 as operating on the normal scale with the scale factor relay 281 energized and a voltage —E applied to the range potentiometer 125. During this phase of operation the pen 5 traces a dotted line on the chart and this is accomplished by periodically lifting the pen from the chart surface by means of the solenoid 119, Figs. 9 and 12. To this end, the pen solenoid is energized from a suitable A. C. source through a circuit 288 including the pen lifting thyratron amplifier 284, a periodically operated switch 285 and the scale factor relay contacts 286 and 287. The switch 285 controls the A. C. input so as normally to cause periodic interruption of the solenoid energizing current.

When the scale factor is changed, such as from normal to expanded, the abrupt change of potentiometer voltage at the conductor 277 causes a large unbalance voltage at the range amplifier and a correspondingly large output current. This causes the range motor to speed up and to move the potentiometer contact 124 at comparatively high speed toward a new balance position on the potentiometer. During this operation it is desirable to lift the pen to avoid a random trace on the chart and this is accomplished by means of the temporarily large unbalance voltage at input conductor 289 of the pen amplifier 284 which causes the thyratron circuit of amplifier 284 to fire so as to energize the pen solenoid 119 and lift the pen. When the new balance position is reached on the expanded scale the output of the range amplifier 266 is zero, thereby causing the motor to stop and the solenoid 119 to be de-energized.

The voltage on conductor 289 fires the thyratron amplifier 284 only in case of large voltage unbalance at the range amplifier 266 due to change in scale factor, or possibly disturbance caused by manual adjustment of the X and Y integrators as indicated at 230 and 231, Fig. 1, for arbitrarily fixing the flight position. Accordingly the pen is lifted during such operations. For usual normal scale operation, the thyratron amplifier 284 is fired through the circuit 288 including the periodic switch 285.

It will therefore be seen that the scale factor change from normal to expanded scale, or vice versa, takes place within a narrow overlap defined by the characteristics of the thyratron circuit at a predetermined distance from the simulated radio range station as determined by the X and Y resolver voltages on conductors 269 and 270. In each case the unbalanced voltage at the potentiometer 125 causes the range motor to move the pen to a balance position corresponding to the new scale factor, i. e., in a change from normal to expanded scale the pen moves from a point well within the chart to the outer periphery, and vice versa in a change from expanded to normal scale.

As previously indicated, the pen mechanism operates through a distance equal to the radius of the chart rather than its diameter. This is accomplished by rotating the chart through 180° and also by reversing the direction of rotation of the range motor when the pen reaches the center position represented by the four grounded connections of the integrators 230 and 231. Reversal of instantaneous polarity occurs when the integrator contacts pass over these grounded positions with the result that the resolved voltages led to the azimuth and range motors cause reversal of the range motor and rotation of the azimuth motor until the chart position is stabilized at a position 180° from its former position. Auxiliary means may be provided if desired for positively rotating the chart through 180°, although such operation is inherent in the apparatus herein disclosed. Referring more particularly to Figs. 20 and 22 and assuming that the pen is tracing a course that goes over the radio station, there will be a slight overtravel of the pen past the center of the chart after the contacts of the X and Y integrators, Fig. 20, pass the zero grounded positions. Prior to this when the pen is approaching the chart center, the azimuth control voltages $+E_x \cos \theta$ and $-E_y \sin \theta$ tend to remain equal since any unbalance will cause rotation of the chart in a direction to equalize the voltages. However, after passing the chart center, the unbalance voltage will cause rotation of the chart in a direction to increase, instead of decrease, the unbalance. After rotating 180° the chart reaches a position of stable equilibrium.

The arrangement in actual practice of the radio range and various radio marker stations is well known and need not be described in detail other than to point out that in addition to the A and N range signals there are located along the on-course beams of the radio station identifying fan markers for enabling the pilot to check his position. Additional landing field markers are also located much nearer the station. These additional markers comprise so called "outer," "middle" and "inner" markers leading directly to the landing field for providing more accurate checks on the pilot's approach to the field itself.

A "Z" marker signal is also directed vertically from the station to indicate in a positive manner the center of the "cone-of-silence." For blind landing aids, localizer and glide beams are provided for guiding the pilot along a gradual descent path to the landing strip itself. An arrangement for simulating these signals in general is illustrated and described in my above identified patent.

In the present invention the arrangement for simulating range and marker signals corresponding to those above described is shown schematic by Figs. 23 and 24, reference also being had to previous figures as hereinafter indicated.

Fig. 23 which supplements in greater detail Figs. 4, 7, 8 and 11, illustrates the A and N range signal attenuating means, the fan markers and the Z marker. As previously described the volume or intensity of the A and N signals increases as the simulated flight approaches the radio station and the simulation of signal reception is accomplished for example by progressively cutting out resistance in the signal energizing circuit as the recording pen is moved toward the center of the chart. As the pen 5 is moved by the range motor 105 toward or away from the center of the chart the grounded contact 126 which is mechanically coupled as indicated at 273 to the pen 5 is moved along the A and N range resistance 88 so as to vary the resistance in the primary circuit 291 of transformer 293 which also includes an A. C. source and the scale factor relay contacts 292. The transformer secondary is connected to the oscillator controlled thermionic amplifier 294, the plate circuit of which includes a coupling condenser 295 and conductor 86 which is connected to the A and N contacts 76 as illustrated by Fig. 7. The thermionic amplifier 294 consists of a triode valve whose grid 296 is energized by the 1020 cycle oscillator 87 and whose cathode filament 297 is energized from the transformer 293 as described in my above identified application. As the primary current of the transformer 293 varies in accordance with variation of resistance 88, the cathode filament 297 is energized accordingly so as to vary the cathode emission, thereby varying the plate current which flows in conductor 86 to the A and N potentiometer, Fig. 7, and through the keyer 91 and conductor 290 to the student's earphones 92. A signal lamp 298 may be connected in parallel with the earphones for providing visual indication. This cathode control method provides for smooth changes in signal volume because of the thermal capacity of the filament, thereby eliminating abrupt or unexpected changes that might otherwise be caused by slight irregularities in the A and N range resistance 88.

For the purpose of adjusting the signal intensity so as to correspond to the simulated flight position before and after a change of scale factor, a resistance 299 is arranged to be cut in and out of the filament energizing circuit by the scale factor relay contacts 292. In the position shown the apparatus is operating on the expanded scale and the relay 281 is deenergized causing the contacts 292 to be closed for shunting the resistance 299. Accordingly the signal tone will be correspondingly louder for a given position of the pen controlled contact 126 than when the apparatus is on the normal scale.

The operation of fan marker signals depends on two conditions, namely, the flight position must be within a predetermined angle including the on-course beam along which the fan marker is located, and the flight must also be a predetermined distance from the station. The range distance is determined by the position of a relatively fixed marker contact 143, Figs. 10 and 23, that is in the path of a travelling contact 131 on the pen carriage. The marker contact 143 is adjustable so that it can be located at any desired distance from the radio station. The azimuth angle subtended by the fan marker is generally about 60° and is represented by the cam member 99, Figs. 4 and 23, which is rotatable with the azimuth shaft 10 in the manner previously described. When the cam 99 is within 30° to either side of the on-course beam arm it closes the tone circuit contacts 96 which complete a circuit from ground through the keyer 91 to a thermionic amplifier 300 whose plate circuit is connected to the student's earphones 92. The valve grid 301 is energized by the high-pitched 3000 cycle oscillator 302 and the cathode heater 303 is energized through the transformer 304 in a manner presently described so as to vary the cathode emission in accordance with the position of the flight with respect to the fan marker.

The keyer 91 is provided with a separate fan marker cam for each on-course beam for causing identifying signals, such as one dash for the North beam and 3 dashes for the South beam. The cathode-plate current so interrupted produces identifying fan marker signals in the earphones 92 or signal lamp 298.

When the flight position is, for example, at an edge of a fan marker the signal is weaker. This simulation is provided by means of the fan marker resistance 100, Figs. 2, 8 and 23. This resistance is aligned with cam 99 and is movable with the azimuth shaft 10 so that the beam arm contact 103 includes a greater resistance in the cathode heater circuit when the flight position is off center on the fan marker signal pattern. The primary winding circuit of the transformer 304 includes beginning with the grounded range contact 131 and the coacting fixed contact 143, the conductor 305, contact 103, fan marker resistance 100, the center tap conductor 306 and the scale factor relay contacts 307 which are connected to an A. C. source. It will be noted that the fan markers are operative only on the expanded scale by reason of the scale factor relay contacts 307.

The localizer beam is for the purpose of supplementing the main on-course beam when the flight position is within the expanded scale range and subtends an angle of 30° leading to the landing field itself, Figs. 8 and 24. This is simulated by means of the localizer cam 98 and cooperating contacts 95, Figs. 2, 4, 8 and 24. The cam 98 rotates with the azimuth shaft 10 so that the corresponding beam arm contacts 95 are closed when the flight azimuth position is within 30° of the localizer beam. The contacts 95 control the primary circuit of the transformer 314 through a beam selector switch 315 and scale factor relay contacts 316, one of which is connected to an A. C. source. The beam selector switch 315 determines the direction of the landing field.

The secondary winding of the transformer 314 is connected through a rectifier 317 to the localizer resistance or potentiometer 101, the opposite terminals of which have positive and negative D. C. potential with respect to the grounded center tap 318. Accordingly the center-zero localizer indicator 319 which is connected to contact 104 in sliding contact with the potentiometer 101 indicates zero, i. e., vertical indication as shown, when the flight position is exactly along the center line of the localizer beam and indicates a right or left position when the contact 104 is on one side or the other of the grounded center tap. The localizer potentiometer 101 is movable with the azimuth shaft 10 in fixed relation to the cam 98 as shown by Fig. 2B.

The localizer indicator 319 can be used in a well known manner with a glide beam indicator to provide a cross-pointer indicator for blind landing maneuvers. In such a case the range controlled contact 133 of the glide path potentiometer 136 may be connected in the manner illustrated in Fig. 22 of my above identified patent to one terminal of a galvanometer, the other terminal of which is connected to an adjustable altimeter contact for simulating the flight position with respect to the glide beam.

The landing markers are designated as "outer," "middle" and "inner" markers in the order of approach to the landing fields and are located within an angle of 3° along the approach path. This is simulated by the landing marker cam 97 and cooperating contacts 94, Figs. 4, 8 and 24 and the range positions of the markers are simulated by the outer, middle and inner contacts 134, 135 and 139, respectively. These contacts are connected respectively to the primary windings of filament energizing transformers 320, 321, 322 of the thermionic marker signal amplifiers 323, 324 and 325, respectively. The grids of the outer and middle marker amplifiers are each connected through a keyer to an oscillator of different tone, the outer marker signal, for example, being of low pitch and characterized by two dashes and the middle marker signal being of high pitch and characterized by six dots, for example. The grid of the inner marker amplifier 325 is directly connected to a high pitched oscillator so that the signal is a steady tone. When the grounded range controlled contact 131 engages in succession the landing marker contacts 134, 135 and 139 the corresponding filament transformer is energized for producing the signal tone in the receiver 92 in the manner above described. The other terminals of the transformer primaries are connected as indicated to a common supply conductor 326 for energizing the filaments from an A. C. source through the landing marker filament control contacts 94, beam selector switch 315' and the scale factor relay contacts 316. Accordingly the marker signals are operated only when the flight position corresponds to the azimuth angle and range of the marker in question. The beam selector switches 315 and 315' are gang operated as indicated so that the landing approach beam can be selected by single switching operation.

The "Z" marker comes into operation only when the pen reaches the center of the chart representing the range station. When the pen reaches this position the pen carriage closes the Z marker contacts 308, Fig. 23, one of which is grounded and the other being connected by conductor 309 to the primary of the filament energizing transformer 310. As in the case of the fan marker amplifier the Z marker thermionic amplifier 311 has its grid 312 energized from the high pitched oscillator 302 and the emission of cathode 313 controlled by the transformer 310 so that the signal rises and falls in a realistic manner. The plate circuit of amplifier 311 is connected to the student's earphones 92 for reception of the Z marker signal.

It will be noted that a typical cone-of-silence is simulated when the range resistance contact 126 moves off the resistance at its inner terminal near the center of the chart. This interrupts the A and N signal circuit and the signal tone rapidly dies out in accordance with the decrease of cathode emission of the amplifier 294 in a realistic manner. When the range motor is reversed for moving the contact 129 out of the cone-of-silence to engage the resistance 288 the signal tone surges back at the desired rate by reason of the aforesaid cathode control.

My invention is not limited to maneuvers with respect to a single station and can be used for simulating "cross-country" operation, i. e., flying a course defined by interconnecting beams of different stations. In such operation, the pilot when he reaches the point of intersection of the beam he has been flying and the beam to which he wishes to transfer his course, tunes his radio on the new station and then follows the on-course beam of that station. This can be simulated by setting in its angular position the beam arm corresponding to the connecting beam of the new station and transferring the flight position at the point of beam intersection from the original beam to the corresponding point on the new beam. This adjustment and transfer are made at the time the student is tuning on the new station so that a comparatively easy transition can be made from one beam to another for all radio range patterns.

It should be understood that this invention is not limited to specific details of construction and arrangement thereof herein illustrated, and that changes and modifications may occur to one skilled in the art without departing from the spirit of the invention. For example, the trainer may be mounted for rotation in azimuth if desired so that the actual compass bearing of the trainer corresponds to the bearing of the simulated flight position according to well-known practice.

I claim:

1. In aircraft training apparatus for simulating radio range signals, a plurality of radially extending arms for representing the on-course direction beams of a radio range station, means for independently adjusting said on-course arms so as to correspond to a given radio range pattern, a plurality of signal controlling contact structures positioned within each sector defined by said on-course arms, and means flexibly interconnecting said contact structures and said on-course arms for automatically positioning said contact structures in the respective sector defined by a pair of arms to correspond to the desired signal pattern when said pattern is changed by adjustment of one or both of the aforesaid pair of on-course arms.

2. In aircraft training apparatus, simulated radio signal controller means comprising a plurality of concentrically arranged signal attenuating elements, means adapted to cooperate with said attenuating elements for representing a position in azimuth comprising a plurality of radially extending independently adjustable members each representing a radio range direction beam, a plurality of contacts positioned between each pair of said adjustable members for cooperating with said attenuating elements for representing a signal pattern, and means for automatically positioning said contacts in a desired signal pattern relation to said pair of members in accordance with movement of either one or both of said pair of members including flexible spacing structure interconnecting said contacts and said pair of members.

3. In aircraft training apparatus for simulating maneuvers on a radio range, signal controller means comprising a rotatable shaft, a plurality of resistance elements including signal attenuating elements positioned concentrically of said shaft, switch contact structure connected to said rotatable shaft including contacts adapted to cooperate with said attenuating elements, a plurality of rotatable members adjustable independently of said shaft, each representing a direction beam and having switch contact structure including contacts adapted to cooperate with said attenuating elements, and a plurality of spaced contacts positioned between each pair of said rotatable members for coacting with said attenuating elements and arranged to be adjusted in proportionate spaced relation to each other and to said pair of rotatable members in accordnce with movement of either one or both of said pair of rotatable members.

4. In aircraft training apparatus for simulating maneuvers on a radio range, a signal controller and recorder unit comprising a supporting frame, a rotatable member mounted on said frame, a chart operatively connected to said member for rotation in azimuth about a center representing a radio range station, a coacting charting element movable with respect to said chart to represent range from said radio range station, a plurality of resistance elements mounted on said frame, switch contact structure connected to said rotatable member including contacts adapted to cooperate with said resistance elements respectively, and a spider-like structure composed of a plurality of independently adjustable elements, each representing a direction beam and rotatably mounted on said frame and having switch contact structure including contacts adapted to cooperate with said resistance elements.

5. In aircraft training apparatus having signal attenuating circuits for simulating flight maneuvers on a radio range, signal controller means comprising a rotatable shaft representing azimuthal position of the simulated flight, a plurality of resistance elements connected in said circuits and positioned about said shaft, a switch contact assembly movable with said rotatable shaft and including contacts adapted to engage said resistance elements respectively, a plurality of members each representing a radio direction beam rotatably adjustable with respect to said shaft and having switch contacts also adapted to engage said resistance elements, a plurality of sets of contacts carried by each of said members respectively arranged to control other signal circuits for representing radio markers, and cam structure movable with said switch contact assembly for operating respectively the sets of contacts on any one of said members in accordance with a simulated radio pattern.

6. In flight training apparatus having recording means for charting simulated flight maneuvers including a circular chart and a pen mounted for relative movement with respect to the center of said chart, electro-magnetic means operatively related to said pen for lifting said pen periodically from said chart so as to trace a dotted line thereon, said pen being adapted to trace a continuous line when said electro magnetic means is inoperative, said dotted and continuous lines representing respectively different chart scale factors of the simulated flight, a relay for controlling said electromagnetic means, and means controlled in accordance with the radial distance of the simulated flight from a radio range station represented by the center of said chart for controlling said relay so as to change said scale factor.

7. In flight training apparatus having recording means for charting simulated flight maneuvers including a circular chart and a pen mounted for relative movement with respect to the center of said chart, electro-magnetic means operatively related to said pen for lifting said pen periodically from said chart so as to trace a dotted line thereon, said pen being adapted to trace a continuous line when said electromagnetic means is inoperative, said dotted and continuous lines representing respectively different chart scale factors of the simulated flight, a relay for controlling said electromagnetic means, means controlled in accordance with the position of the simulated flight from a radio range station represented by the center of said chart for controlling said relay so as to change said scale factor, and means for also controlling said electromagnetic means for lifting said pen from said chart during scale factor change.

8. In a grounded aircraft trainer having an enclosing structure for a student simulating in form the fuselage of a flight machine, said simulated fuselage structure having an enlarged opening in one of its sides, flight recording apparatus including a chart and cooperating pen mechanism positioned in said structure at said opening so that said chart is positioned substantially in a vertical plane and can be readily and clearly inspected by an instructor from the exterior of said simulated fuselage structure and is not visible to said student.

9. In a grounded aircraft trainer having an enclosing structure for a student generally simulating in form the fuselage of a flight machine, said simulated fuselage structure having a nose portion, flight recording apparatus including a chart and cooperating pen mechanism mounted on said structure at said nose portion so that said chart is positioned substantially in a vertical plane extending transversely of the longitudinal axis of said fuselage structure and can be clearly inspected by an instructor from a position in front of said nose portion.

10. In a grounded aircraft trainer having an enclosing structure for a student simulating in form the fuselage of a flight machine, said simulated fuselage structure having an enlarged opening in its nose portion, a compact structural unit mounted in said nose portion comprising flight recording apparatus including a rotatable chart and cooperating pen mechanism positioned at said nose opening so that said chart is positioned substantially vertically and transversely of the longitudinal axis of said fuselage structure and can be clearly inspected by an instructor from the interior of said simulated fuselage structure and is not visible to said student.

11. In aircraft training apparatus having means for simulating radio range signals including a pair of signal attenuating resistance elements, one of said elements corresponding to one signal field distribution, and the other element corresponding to another signal field distribution, a source of signal current for said elements, contact structure associated with said elements for simulating radio range sectors and defining in a given sector a point of maximum signal intensity for one signal and a range of minimum intensity for the other signal, a resistance interconnecting a pair of contact structures defining the range of minimum signal intensity and arranged in shunt relation to resistance of the corresponding element so that a weak signal current can flow in said element within said sector, and a receiver for said signal current.

12. In aircraft training apparatus having potentiometer means for simulating radio range signals, adjusting apparatus for establishing and maintaining a plurality of potentiometer contact positions comprising a pair of movable members representing on-course direction beams of a radio range station adjustable independently of each other, a plurality of normally spaced signal controlling contacts positioned between said adjustable on-course members for engaging said potentiometer means, and means flexibly interconnecting said contacts and said on-course members and arranged automatically to maintain said contacts in proportionate spaced relation to each other and to said on-course members for representing a predetermined radio range pattern in accordance with the adjustment of either one or both of said on-course members.

13. In grounded flight training apparatus for simulating radio range signals and practicing maneuvering with respect to a landing field having a landing beam, signal means including a resistance element representing the landing beam, a plurality of other signal means representing marker signals adjustably positioned so as to represent an approach to said field, and calibrated means for horizontally and bodily shifting the position of said resistance element independently of said marker signal means for representing different landing field positions on the range, and means operated according to the simulated azimuth and range positions of said flight for controlling the energization of the aforesaid signal means.

14. In flight computing apparatus having electrical means adjustable according to simulated air speed and compass heading for obtaining azimuth and range control voltages, apparatus for representing the instant flight position according to polar coordinates comprising a range motor for positioning an element according to simulated distance from a reference radio station, an azimuth motor for angularly positioning another element according to the azimuthal flight position with respect to said station, means for amplifying said control voltages for operating said range and azimuth motors, and means adjustable in accordance with operation of said range motor for varying the gain of the amplifying means for the azimuth motor so as to correct the tendency of the azimuth motor to be sluggish for low range values and to be over-sensitive for high range values.

15. Flight training apparatus comprising electrical means adjustable according to simulated air speed and compass heading and electrical means adjustable according to wind velocity and direction for obtaining voltages representing components of simulated air speed and wind velocities along axes designated X and Y respectively of a Cartesian coordinate reference system, means for integrating the sum of the respective X component voltages and for integrating the sum of the respective Y component voltages with respect to time to derive voltages representing the instant position of the simulated flight in said reference system, a coordinate converter system including a pair of sine-cosine resolving means energized by the X and Y instant position voltages respectively, a chart rotatably mounted to represent change in polar position of the simulated flight with respect to a station represented by the center of said chart, a motor for rotating said chart, a cooperating pen mechanism movable across said chart to represent change in range distance of the simulated flight from the center of said chart whereby the instant flight position is represented by polar coordinates, a range motor for operating said pen mechanism, said pair of resolving means each having electrical circuit elements for deriving values of the X and Y position voltages respectively varying sinusoidally and cosinusoidally in accordance with the operation of said chart motor for deriving polar coordinate control voltages, and electrical circuit connections from each resolving means to both said chart and range motors for operating said motors according to said control voltages so as to chart the instant position of said simulated flight.

16. Fight training apparatus comprising electrical means adjustable according to simulated air speed and compass heading and electrical means adjustable according to wind velocity and direction for obtaining voltages representing components of simulated air speed and wind velocities along axes designated X and Y respectively of a Cartesian coordinate reference system, means for summing and integrating respectively the X and Y voltage components for representing the X and Y instant position of the simulated flight in said reference system, a coordinate converter system including a pair of potentiometer resistance elements energized by the integrated X and Y voltages respectively, a shaft rotatably mounted to represent change in polar position of the simulated flight with respect to a radio range station, a motor for rotating said shaft, mechanism movable to represent change in range distance of the simulated flight from said radio range station, a range motor for operating said mechanism, radio range signal attenuating means controlled by said shaft and range motors for simulating the reception of radio range signals according to the simulated flight position, each potentiometer element having two contacts coacting therewith and positioned in accordance with the operation of said shaft motor for deriving polar coordinate control voltages, and electrical circuit connections from respective contacts of each potentiometer element to both said shaft and range motors for operating said motors according to said control voltages, so as to control said attenuating means whereby the received radio range signals correspond to the instant position of said simulated flight.

17. Fight training apparatus comprising electrical means adjustable according to simulated air speed and compass heading and electrical means adjustable according to wind velocity and direction for obtaining voltages representing components of simulated air speed and wind velocities along axes designated X and Y respectively of a Cartesian coordinate reference system, means for summing and integrating respectively the X and Y voltage components for representing the X and Y instant position of the simulated flight in said reference system, a coordinate converter system including a pair of cosinusoidal resolving means energized by the X and Y instant position voltages respectively, a chart rotatably mounted to represent change in polar position of the simulated flight with respect to a radio station represented by the center of said chart, a motor for rotating said chart, a cooperating pen mechanism movable across said chart to represent change in range distance of the simulated flight from the center of said chart, a range motor for operating said pen mechanism, said X and Y resolving means each being controlled in accordance with the operation of said chart motor for deriving polar coordinate control voltages, and electrical circuit connections between the X resolving means and both said chart and range motors and also between the Y resolving means and both said chart and range motors for operating said motors according to said control voltages so as to chart the instant position of said simulated flight.

RICHARD C. DEHMEL.

REFERENCES CITED

The following references are of record in the file of this patent:

UNITED STATES PATENTS

| Number | Name | Date |
|---|---|---|
| 1,422,925 | Carter | July 18, 1922 |
| 1,687,555 | Gasiorowski | Oct. 16, 1928 |
| 1,985,266 | Smith | Dec. 25, 1934 |
| 2,070,178 | Pottenger | Feb. 9, 1937 |
| 2,080,186 | Reymond | May 11, 1937 |
| 2,224,182 | Crooke | Dec. 10, 1940 |
| 2,226,726 | Kramar | Dec. 31, 1940 |
| 2,229,069 | Geyger | Jan. 21, 1941 |
| 2,308,566 | Noxon | Jan. 19, 1943 |
| 2,315,606 | Evans | Apr. 6, 1943 |
| 2,366,603 | Dehmel | Jan. 2, 1945 |
| 2,389,359 | Grow | Nov. 20, 1945 |
| 2,411,041 | Kahn | Nov. 12, 1946 |
| 2,438,126 | Muller | Mar. 23, 1948 |
| 2,454,503 | Crane | Nov. 23, 1948 |

OTHER REFERENCES

Air Corps News Letter, volume 21, No. 6, Mar. 15, 1938, pages 7 and 8.